United States Patent
Kayashima et al.

(10) Patent No.: US 8,850,592 B2
(45) Date of Patent: Sep. 30, 2014

(54) UNAUTHORIZED OPERATION DETECTION SYSTEM AND UNAUTHORIZED OPERATION DETECTION METHOD

(75) Inventors: Makoto Kayashima, Yokohama (JP);
Shinichi Tsunoo, Sagamihara (JP);
Hiroshi Nakagoe, Yokohama (JP);
Hiromi Isokawa, Sagamihara (JP);
Norio Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 12/808,130

(22) PCT Filed: Apr. 2, 2010

(86) PCT No.: PCT/JP2010/002461
§ 371 (c)(1),
(2), (4) Date: Jun. 14, 2010

(87) PCT Pub. No.: WO2011/111124
PCT Pub. Date: Sep. 15, 2011

(65) Prior Publication Data
US 2011/0289589 A1 Nov. 24, 2011

(30) Foreign Application Priority Data

Mar. 10, 2010 (JP) ................ 2010-052483

(51) Int. Cl.
*G06F 21/00* (2013.01)
*G06F 21/60* (2013.01)
*G06F 21/55* (2013.01)
*G06F 21/52* (2013.01)
*H04L 29/06* (2006.01)

(52) U.S. Cl.
CPC ............ *G06F 21/556* (2013.01); *G06F 21/606* (2013.01); *G06F 2221/2101* (2013.01); *G06F 21/552* (2013.01); *G06F 21/52* (2013.01); *G06F 2221/0737* (2013.01); *H04L 63/1416* (2013.01); *G06F 2221/2119* (2013.01)
USPC .................................. 726/26; 726/11; 726/13

(58) Field of Classification Search
CPC ..... G06F 21/606; G06F 21/52; G06F 21/556; G06F 21/552; G06F 21/10; G06F 2221/2101; G06F 2221/2119; G06F 2221/0737; H04L 63/0428; H04L 63/1416
USPC ............................................ 726/26
See application file for complete search history.

(56) References Cited

U.S. PATENT DOCUMENTS

| | | |
|---|---|---|
| 5,745,686 A | 4/1998 | Saito et al. |
| 5,822,533 A | 10/1998 | Saito et al. |
| 5,897,643 A | 4/1999 | Matsumoto |
| 6,067,541 A | 5/2000 | Raju et al. |
| 6,119,208 A | 9/2000 | White et al. |
| 6,408,336 B1 | 6/2002 | Schneider et al. |
| 6,412,017 B1 | 6/2002 | Straube et al. |
| 6,889,231 B1 | 5/2005 | Souder et al. |
| 6,996,672 B2 | 2/2006 | Lubbers et al. |
| 7,191,198 B2 | 3/2007 | Asano et al. |
| 7,788,235 B1 * | 8/2010 | Yeo .............................. 707/687 |
| 7,966,426 B2 | 6/2011 | Smith et al. |
| 8,011,003 B2 | 8/2011 | Rowney et al. |
| 8,180,743 B2 * | 5/2012 | Claudatos et al. ............ 707/694 |
| 8,181,036 B1 | 5/2012 | Nachenberg |
| 8,191,156 B2 | 5/2012 | Kubo |
| 8,286,253 B1 | 10/2012 | Lu et al. |
| 8,341,418 B2 | 12/2012 | Yoshimura |
| 8,352,535 B2 | 1/2013 | Peled et al. |
| 8,370,948 B2 | 2/2013 | Troyansky |
| 8,407,341 B2 | 3/2013 | Gillette et al. |
| 2002/0095592 A1 | 7/2002 | Daniell et al. |
| 2002/0099837 A1 | 7/2002 | Oe et al. |
| 2004/0267834 A1 | 12/2004 | Sasaki et al. |
| 2005/0131902 A1 | 6/2005 | Saika |
| 2005/0134894 A1 | 6/2005 | Littman et al. |
| 2005/0144308 A1 | 6/2005 | Harashima et al. |
| 2005/0288939 A1 | 12/2005 | Peled et al. |
| 2006/0224589 A1 | 10/2006 | Rowney et al. |
| 2007/0083938 A1 | 4/2007 | Aoki et al. |
| 2008/0077971 A1 | 3/2008 | Wright et al. |
| 2008/0077996 A1 | 3/2008 | Kubo |
| 2008/0263111 A1 | 10/2008 | Asano et al. |
| 2008/0313198 A1 | 12/2008 | Kim et al. |

| | | | |
|---|---|---|---|
| 2009/0241197 A1* | 9/2009 | Troyansky | 726/26 |
| 2011/0131279 A1 | 6/2011 | Karnik | |
| 2012/0297463 A1 | 11/2012 | Orbach et al. | |
| 2013/0104191 A1 | 4/2013 | Peled et al. | |

FOREIGN PATENT DOCUMENTS

| | | |
|---|---|---|
| JP | 08-292961 | 11/1996 |
| JP | 09-044432 | 2/1997 |
| JP | 09-054735 | 2/1997 |
| JP | 11-259459 | 9/1999 |
| JP | 2002-288030 | 10/2002 |
| JP | 2003-044297 A | 2/2003 |
| JP | 2005-149243 | 6/2005 |
| JP | 2005-189995 | 7/2005 |
| JP | 2006-302170 | 11/2006 |
| JP | 2007-183911 A | 7/2007 |
| JP | 2007-334386 | 12/2007 |
| JP | 2008-052570 | 3/2008 |
| JP | 2008-102827 A | 5/2008 |
| JP | 2008-130077 A | 6/2008 |
| JP | 2008-181446 | 8/2008 |
| JP | 2009-020812 | 1/2009 |
| JP | 2009-187374 | 8/2009 |
| JP | 2009-237804 A | 10/2009 |
| JP | 2010-003051 | 1/2010 |
| JP | 2010-015543 A | 1/2010 |
| JP | 2010-123112 A | 6/2010 |
| WO | WO-2008/129915 A1 | 10/2008 |
| WO | WO 2009/147855 A1 | 12/2009 |
| WO | WO-2010/074094 | 7/2010 |

OTHER PUBLICATIONS

Abbadi, Imad M, and Muntaha Alawneh. "Preventing Insider Information Leakage for Enterprises." The Second International Conference on Emerging Security Information, 2008. SECURWARE '08, pp. 99-106.*
U.S. Appl. No. 12/934,235, filed Sep. 23, 2010, Naito et al.
U.S. Appl. No. 12/937,952, filed Oct. 14, 2010, Onodera.
Hitachi Software Engineering Co., Ltd, et al.; Information Security Governance; Jan. 31, 2008; pp. 65-66; 117-125 (with partial translation).
Ichiyanagi, Yoshimi, et al.; A description model for data access control in Salvia operating system; IPSJ SIG Technical Reports; 2005-CSEC-30(33); Jul. 21, 2005; pp. 235-242.
Nikkei BP Government Technology, No. 006; Dec. 15, 2004; pp. 42-48.
PCT International Search Report and Written Opinion on application No. PCT/JP2010/002461 dated Jun. 15, 2010; 11 pages.
PCT International Search Report and Written Opinion on application No. PCT/JP2010/061013 dated Oct. 5, 2010; 7 pages.
PCT International Search Report on Application No. PCT/JP2010/061000 dated Jun. 28, 2010; 3 pages.
USPTO non-final action on U.S. Appl. No. 12/937,952 mailed Aug. 29, 2012; 18 pages.
USPTO Notice of Allowance on U.S. Appl. No. 12/937,952 dated May 15, 2013; 27 pages.
USPTO non-final action on U.S. Appl. No. 12/934,235 mailed Mar. 19, 2013; 32 pages.
USPTO Final Office Action on U.S. Appl. No. 12/934,235 mailed Nov. 19, 2013; 29 pages.

* cited by examiner

*Primary Examiner* — Thanhnga B Truong
*Assistant Examiner* — Narciso Victoria
(74) *Attorney, Agent, or Firm* — Foley & Lardner LLP

(57) ABSTRACT

The content of operations is identified and an alert is generated to an operation having a high risk of information leakage. An agent monitors, for example, operations performed with respect to a dialogue displayed on a client PC. If a file is selected by an operation performed with respect to the displayed dialogue, the agent assigns an identifier indicating a source for the file to the file. If the file is sent as an attached file, the agent identifies an output destination for the attached file as well as the source for the attached file; and if the output destination for the attached file is an external Web server and the source for the attached file is a mail server, the agent generates an alert by determining that an unauthorized operation has been executed; and then sends the generated alert to a management server.

15 Claims, 21 Drawing Sheets

FIG.13

| FILE NAME | SENDER'S NAME | HASH VALUE |
|---|---|---|
| SPECIFI-CATION.DOC | kayashi@sdl.hitachi.co.jp | 7c080a1586d1ef8088a38465ebcaba8a |
| CLIENT LIST.XLS | namba@sdl.hitachi.co.jp | ef8088a38465ebca7c080a1586d17c08 |

1301　　1302　　1303　　393

1311

```
[aaa]
From=XXXX
Server=XXXX
URL=XXXX
```

UNAUTHORIZED OPERATION DETECTION SYSTEM AND UNAUTHORIZED OPERATION DETECTION METHOD

TECHNICAL FIELD

The present invention relates to an unauthorized operation detection system. Particularly, the invention relates to an unauthorized operation detection system and unauthorized operation detection method for detecting an operation that is performed on a client PC and has a high risk of causing an information leakage accident.

BACKGROUND ART

A PC operation log management product for monitoring operations of an information system by a user, detecting an operation designated by an administrator in advance (for example, writing information to removable media), and issuing an alert to the administrator has been conventionally used.

An example of an operation detection system for detecting a malicious operation or a suspicious operation is Patent Literature 1.

CITATION LIST

Patent Literature

[PL1]
Japanese Patent Laid-Open (Kokai) Application Publication No. 2009-20812

SUMMARY OF INVENTION

Technical Problem

With the conventional client PC operation log management product, it is required to designate information output operations such as printing or output to removable media in advance. Moreover, regarding the technique disclosed in Patent Literature 1, the administrator creates a malicious unauthorized operation pattern in advance, registers it in a database in a log analysis server, and then judges the risk according to how the content of an operation by the user matches the registered unauthorized operation pattern. In either case, the administrator needs to make initial settings after defining the unauthorized operation.

Accordingly, the invention aims at realizing a function issuing an alert to an act having a high risk of information leakage without making initial settings for issuing an alert when a specified information output operation is performed, or without making initial settings to define an unauthorized operation pattern, in order to detect the user's operation having a high risk of causing information leakage.

The present invention was devised in light of the problems of the conventional techniques described above, and it is an object of the invention to provide an unauthorized operation detection system, unauthorized operation detection method, and unauthorized operation detection program capable of identifying the content of operations and generating an alert to an operation having a high risk of information leakage.

Solution to Problem

In order to achieve the above-described object, the present invention is characterized in that it includes a monitoring device for monitoring operations performed with respect to information on a screen for an output device coupled to a microprocessor as a monitoring object, wherein the monitoring device identifies a source for input information that is input to the monitoring object in response to an operation to input information to the monitoring object, and assigns an identifier indicating a source for the input information to the input information; and identifies an output destination for output information that is output from the monitoring object in response to an operation to output information from the monitoring object, searches for an identifier indicating a source for the output information, judges whether a combination of the identified output destination for the output information and the searched source for the output information matches a condition for the unauthorized operation, and generates an alert based on the judgment result.

Advantageous Effects of Invention

According to this invention, it is possible to generate an alert to an operation having a high risk of information leakage by identifying the content of the operation.

BRIEF DESCRIPTION OF DRAWINGS

FIG. 13 is a diagram showing a source DB used in an agent and a format example for source information assigned to each file.

DESCRIPTION OF EMBODIMENTS

This embodiment includes: a first means for monitoring the content of operations performed with respect to application programs operating on a client PC (Personal Computer), identifying a source for input information that is input to the client PC, and assigning an identifier indicating the source for the input information to the input information and; a second means for identifying an output destination for output information that is output from the client PC, inspecting an identifier assigned to the output information, and issuing an alert depending on conditions for the source and output destination for the output information.

An embodiment of this invention will be explained below with reference to the attached drawings.

Figure 1:
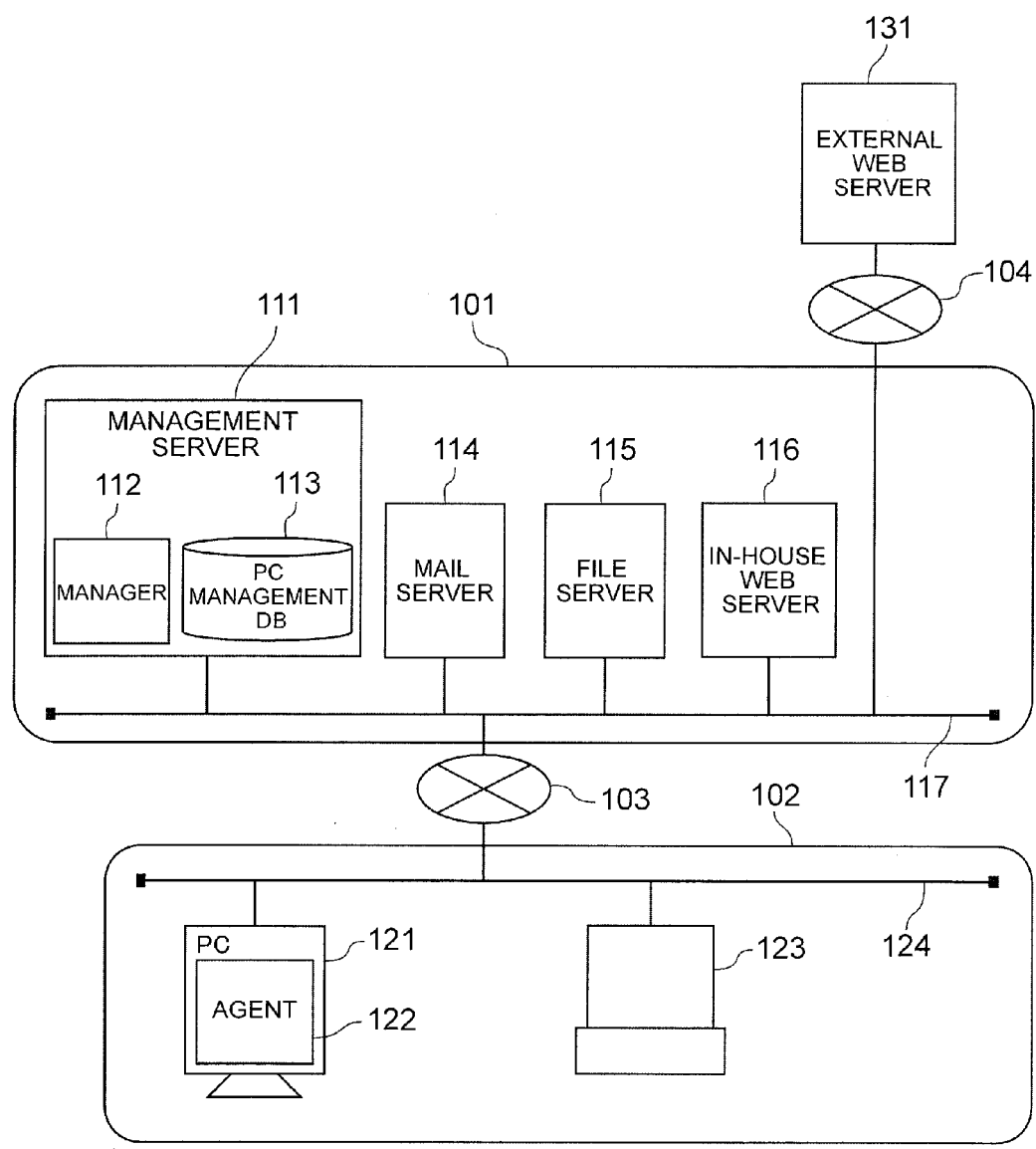
FIG. 1 is a system configuration diagram of an operation detection system according to an embodiment of this invention.

FIG. 1 is a system configuration diagram showing an unauthorized operation detection system according to an embodiment of this invention. The unauthorized operation detection system of this invention is configured so that a LAN (Local Area Network) 117 in an information center 101 and a network 124 in a base 102 are coupled via a wide area network 103 and the information center 101 is further coupled via the wide area network 104 to the Internet. The unauthorized operation detection system includes a management server 111 installed within the information center 101 and a client PC 121 set in the base 102.

The management server 111 sets an area inside the information center 101 and an area inside the base 102 as a management area, sets equipment located in this management area, such as a mail server 114, a file server 115, an in-house server 116, the client PC 121, and a network printer 123, as management objects, and manages these management objects. A manager 112 for controlling the whole unauthorized operation detection system and a PC management DB (DataBase) 113 used by the manager to manage a plurality of client PCs operate on the management server 111.

Each client PC 121 includes a microprocessor on which various application programs are mounted. An agent 122 that recognizes each relevant client PC 121 as a monitoring object and serves as a monitoring device for monitoring operations performed with respect to information on a screen for an output device coupled to the monitoring object operates on each client PC 121.

A user using the client PC 121 carries out their work using e-mail, a Web server, a file server or similar. Therefore, the mail server 114, the file server 115, and the in-house server 116 are installed at the information center 101 and are coupled to the LAN 117. Furthermore, an external Web server 131 that can be accessed by the client PC 121 is coupled to the Internet.

The network 124 in the base 102 is coupled to a network printer 123 used for printing. Incidentally, the external Web server 131 and removable media from among storage media coupled to the client PC 121 are devices which are not management objects of the management server 111, and are processed as inspection objects.

Figure 2:
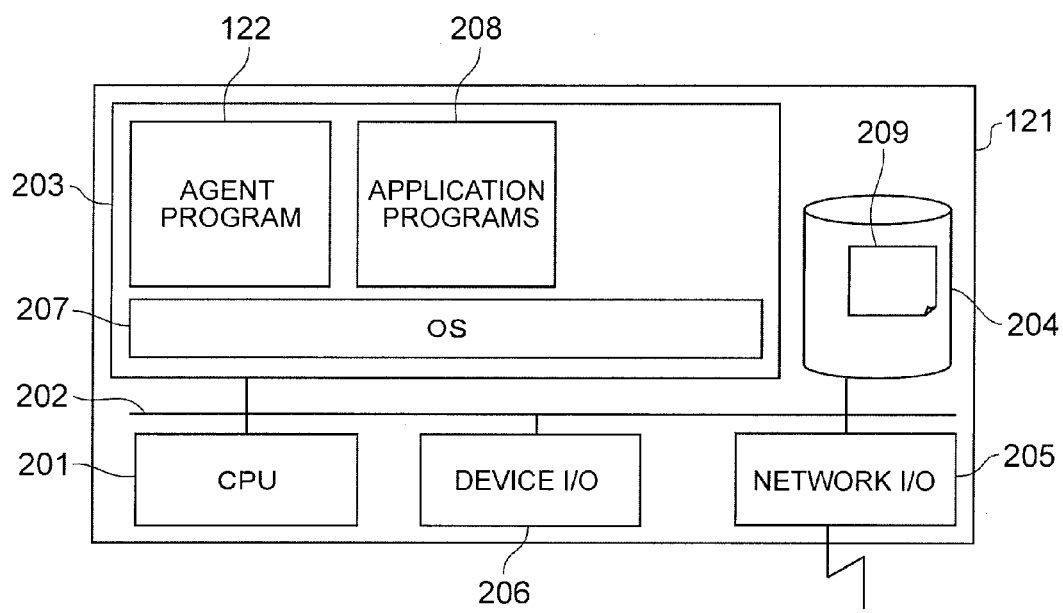
FIG. 2 is a diagram showing an example of the configuration of a client PC according to the invention.

FIG. 2 is a block configuration diagram showing an example of the configuration of the client PC 121 according to this invention. The client PC 121 includes a CPU (Central Processing Unit) 201, a bus 202, a memory 203, a local file system 204, a network I/O 205, and a device I/O 206. The device I/O 206 includes, for example, a USB (Universal Serial Bus) interface. An OS (Operating System) 207 is loaded onto the memory 203, and a program for the agent 122, which is a component of the unauthorized operation detection system, and a plurality of application programs 208 (such as a file explorer, Web browser, mailer, word processor, and spreadsheet software) operate on the OS 207.

A user using the client PC 121 uses any of the application programs 208 and saves files attached to e-mail addressed to the user and received by the mail server 114, files stored in the file server 115, and files registered in the in-house server 116, as files 209 in a local file system 204 for the client PC 121.

A file 209 saved in the local file system 204 may be sometimes exported from the client PC 121, using any of the application programs 208. For example, the file explorer may be used to copy a file to a removable medium coupled to the device I/O 206 or have the network printer 123 print a file, using a print function of the word processor or spreadsheet software.

Furthermore, a file may be attached to the body of mail created by the mailer and sent to addressees inside and outside the organization or uploaded to Web servers inside and outside the organization.

Figure 21:
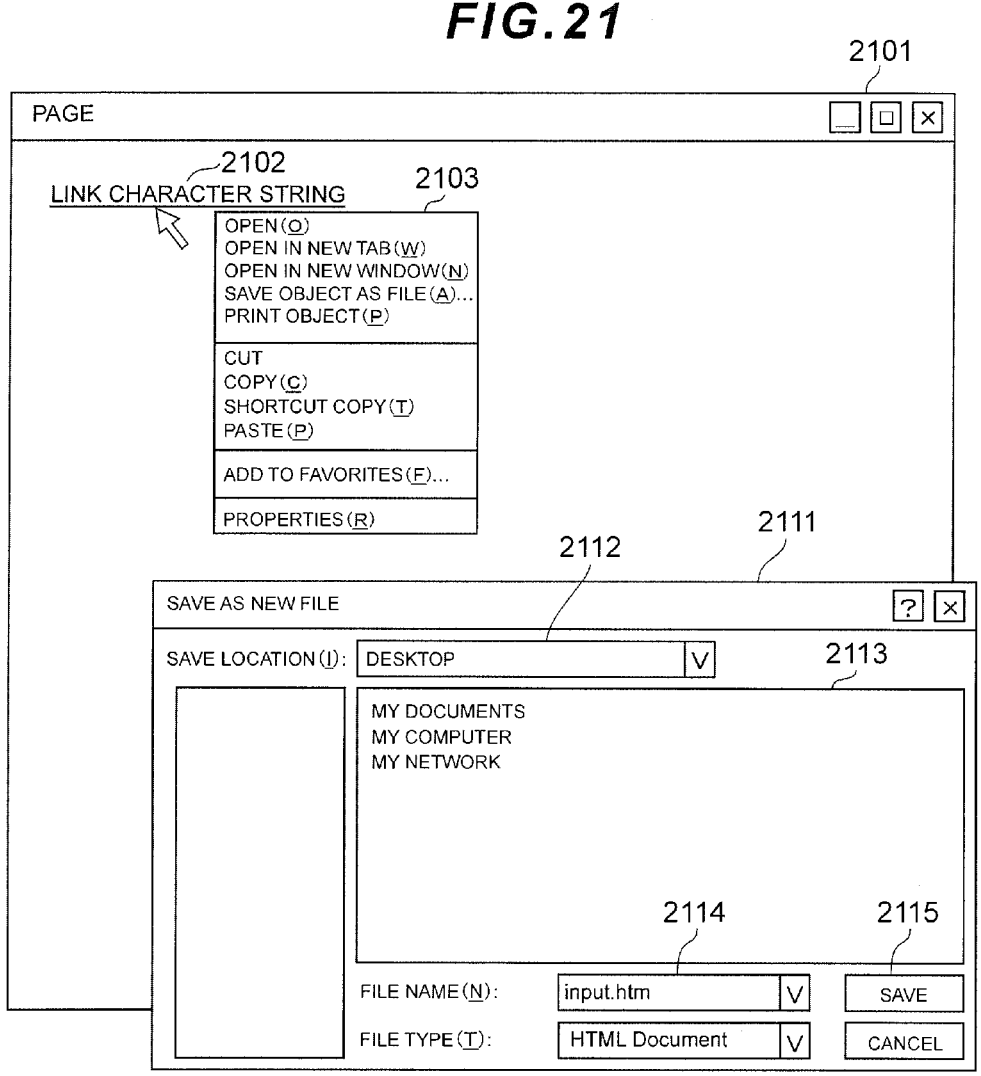
FIG. 21 is a diagram showing a screen example for the Web browser relating to actions according to this invention.

A Web browser screen used to do so is shown in FIG. 21. FIG. 21 is a diagram showing an example of a screen for importing a file when a user operates applications on the client PC 121.

When a mouse (an input device coupled to the client PC 121) is used to click on a Web browser screen (a screen for an output device coupled to the client PC 121) 2101, there is an area called "link" for causing, for example, a screen transition. When a mouse cursor is placed on a link character string 2102 and the left button is clicked, the screen makes the transition to a next screen (also called a page) or processing for displaying a download dialogue 2111 for downloading an object existing in the clicked link destination is executed.

Furthermore, when the mouse cursor is placed on the link character string 2102 and the right button is clicked, a pop-up window, a so-called context menu, is displayed. The context menu 2103 so displayed includes an item saying "save object as file (A)"; and processing for displaying a download dialogue 2111 for downloading an object is executed by left-clicking this item.

The download dialogue 2111 includes a field 2112 indicating the location to save a downloaded file, a field 2113 displaying folder options to save the file, and a field 2114 indicating a file name to be saved. The file name to be saved can be rewritten. The user can select a folder to save the file by operating the fields 2112 and 2113, change the saved file name in the field 2114 as the need arises, download the file using the Web browser by clicking a save button 2115, and save the file in an arbitrary folder.

Figure 3:
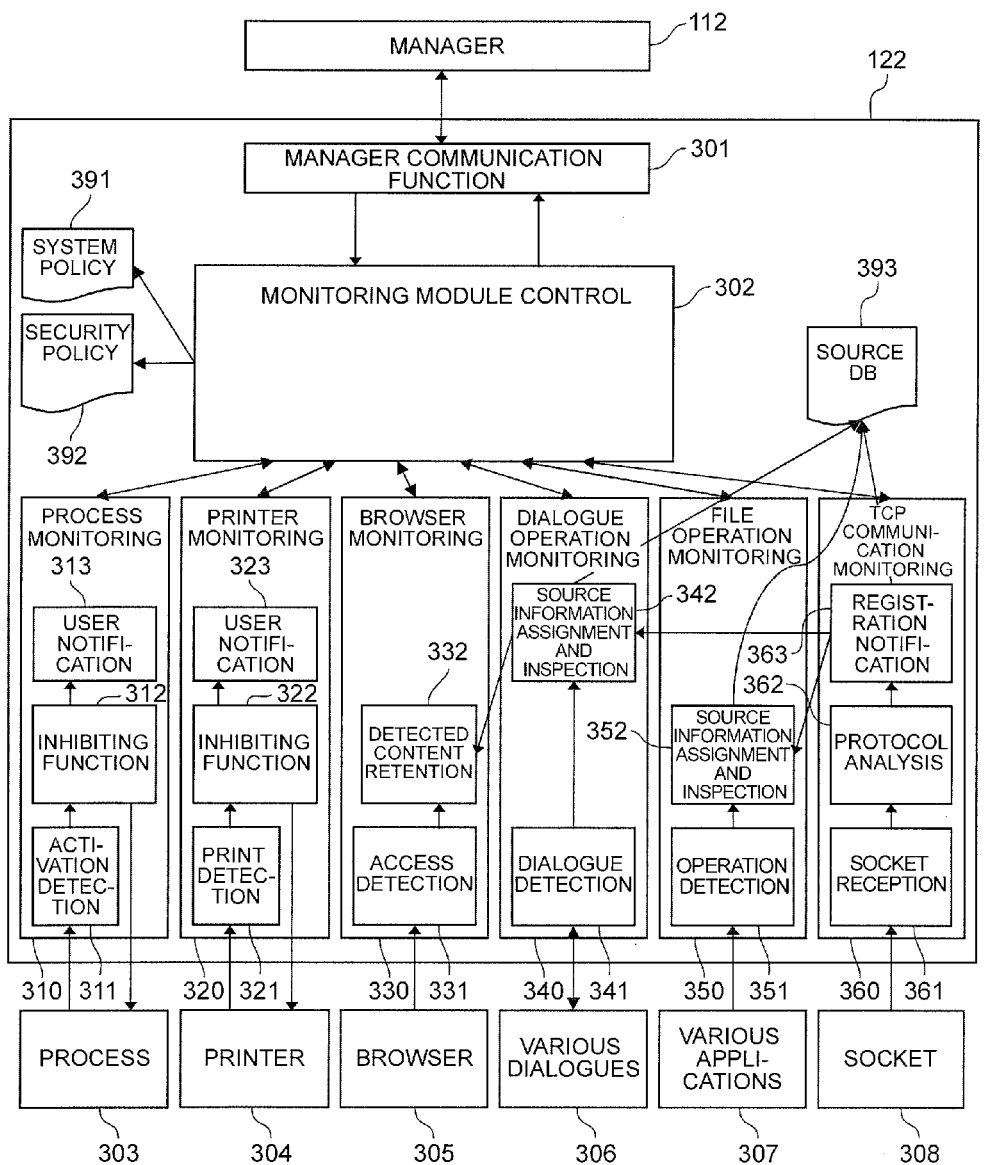
FIG. 3 is a diagram showing an example of the configuration of an agent program operating on the client PC.

FIG. 3 is a diagram showing an example of the module configuration of the agent 122 operating on the client PC 121. The agent 122 includes a manager communication function module 301 in charge of communication with the manager 112, and a monitoring module control module 302 for controlling various monitoring modules for monitoring operations of the client PC 121 by the user.

The agent 122 also includes, as its components: a process monitoring module 310 whose monitoring object is the operating status of a process 303 operating on the client PC 121; a printer monitoring module 320 whose monitoring objects are output operations to the printer 304 including the network printer 123; a browser monitoring module 330 whose monitoring objects are operations by the user by means of the Web browser 305; a dialogue operation monitoring module 340 whose monitoring objects are various dialogues 306 displayed on the screen for the client PC 121 and used by the user to select a file when downloading or uploading the file; a file operation monitoring module 350 whose monitoring objects are operations (for example, clicking the buttons or dragging and dropping an object displayed in an application window) performed also on the screen for the client PC 121 by the user using a pointing device such as a mouse, with respect to various applications 307 displayed on the screen; and a TCP communication monitoring module 360 whose monitoring object is the status of data stream transmission or reception by an application such as mailer for sending and/or receiving data via a network as operated by the user, using a socket 308 or similar according to TCP/IP (Transmission Control Protocol/Internet Protocol).

The agent 122 further includes: a system policy 391 that is a setting file for controlling actions of the modules; a security policy 392 that is a setting file particularly for security-related control; and a source DB 393 for storing information required by the above-described group of monitoring modules to include information related to the user operation. The content and role of the source DB 393 will be explained later.

The process monitoring module 310 realizes: an activation detection function 311 detecting a request for activation of the process 303 on the client PC 121; an inhibiting function 312 inhibiting the activation of the process 303 if the process 303 to be activated conflicts with the security policy 392; and a user notification function 313 notifying the user that the activation has been inhibited.

The printer monitoring module 320 realizes: a print detection function 321 detecting a request for printing using the printer 304 on the client PC 121; an inhibiting function 322 that inhibits printing if data to be printed conflicts with the security policy 392; and a user notification function 323 notifying the user that printing has been inhibited.

The browser monitoring module 330 realizes: an access detection function 331 detecting access to the Web server using the browser 305 on the client PC 121; and a detected content retention function 332 temporarily retaining, for example, an URL (Uniform Resource Locator) of the accessed Web server and received html (Hypertext Markup Language) data.

The dialogue operation monitoring module 340 realizes: a dialogue detection function 341 detecting that a file selection dialogue or a print dialogue is displayed, as the user operating the application programs 208 on the client PC 121; and a source information assignment and inspection function 342 assigning information relating to the source for a file operated by using the dialogue, to that file and inspecting the assigned information relating to the source.

Operations to display the file selection dialogue includes an operation to download or upload a file by using, for example, the Web browser and an operation to save an attached file from a received mail by using the mailer, or an operation to attach a file to mail to be sent. An operation to display the print dialogue is an operation to select a print function using the word processor or spreadsheet software.

The file operation monitoring module 350 realizes: an operation detection function 351 detecting operations performed by the user, for example, clicking on the mouse buttons in a window for the application program 208 on the client PC 121 or dragging and dropping an object displayed in the window; and a source information assignment and inspection function 352 assigning information relating a source for a file operated by using the mouse, to that file and inspecting the assigned information relating to the source.

File operations by clicking on the mouse buttons are an operation to right-click a link displayed on a screen for, for example, the Web browser, display a menu, and save an object indicated by the link as file, and an operation to drag and drop a file attached to a received message screen for the mailer and copy it to the desktop. the TCP communication monitoring module 360 realizes: a socket reception detecting function 361 detecting transmission or reception of a file via a network as a result of the user's operations using network applications on the client PC 121; a protocol analysis function 362 analyzing data sent or received via the socket; and a registration and notification function 363 registering information relating to a source for a file in the source DB 393 when the file is downloaded to the client PC 121 via the socket, and notifying the source information assignment and inspection modules 342, 352 of the information relating to the source for that file.

Each monitoring module described above has a function communicating with other monitoring modules and the source DB 393 depending on the detected content, a function issuing (sending) an alert to the manager 112 via the monitoring module control 302 and the manager communication mechanism 301, and a function generating an alert and detected content logs.

An expression like the "information relating to a (the) file" will be used to describe information relating to this invention in the following explanation, but such information may be expressed in a form other than a data structure such as tables. Accordingly, the "information relating to a (the) file" may sometimes be simply called "information" in order to show no dependence on the data structure. Similarly, it is not always essential to a portion described as a DB to have the data structure as a database, so that the portion described as a DB may also simply called "information."

Moreover, expressions "identification information," "identifier," "name," and "ID" are used to describe the content of each piece of information, but these expressions can be replaced with one another.

Furthermore, a "program" may be used as a subject in the following explanation; however, when the program is executed by a processor, specified processing is executed by using a memory and a communication port (communication control device) and, therefore, the processor may be used as a subject in the explanation. Also, processing disclosed as a program being the subject may be processing executed by a computer or an information processing unit for the management server 111 or similar. Furthermore, part or whole of the program may be implemented by dedicated hardware. It is not always necessary to implement this invention by using a thread mechanism; and any mechanism may be used as long as this invention can be executed by a mechanism such as a micro thread or a process mechanism for managing the execution of programs provided by the OS.

Various programs may be installed to each computer via a program distribution server or storage media.

Incidentally, the management server 111 includes input-output devices. Example of such input-output devices can be a display, a keyboard, and a pointer device, but may include any other devices. As substitutes for the input-output devices, a serial interface and an Ethernet interface may be used as the input-output devices; input and display by the input-output devices may be substituted by coupling a display computer including a display, keyboard, or pointer device, to the above-mentioned interfaces, having the display computer display information to be displayed, and accepting inputs.

Next, a sequence for implementing the first means for detecting the user's import operation on the client PC and assigning an identifier indicating the import operation will be explained with reference to FIG. 4 to FIG. 7.

Figure 4:
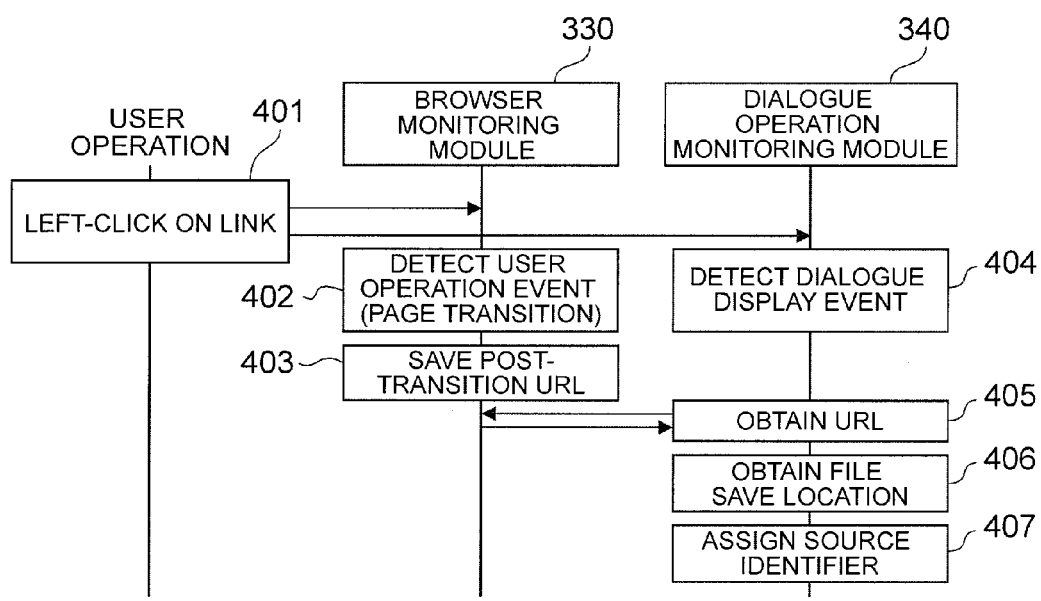
FIG. 4 is a diagram showing an example of a sequence executed by a user's operation, a dialogue operation monitoring module, and a browser monitoring module when importing a file by means of a Web browser.

FIG. 4 shows an example of a sequence illustrating a flow of processing executed by the browser monitoring module 330 and the dialogue operation monitoring module 340 when the user downloads a file by means of the Web browser.

When the user performs an operation to left-click a link displayed on the Web browser (401), a user operation event for page transition occurs on the Web browser and the browser monitoring module 330 detects the user operation event for page transition (402). The browser monitoring module 330 saves a post-transition URL (that is, an URL of the relevant object at a clicked link destination) and waits for an information provision request from the dialogue operation monitoring module 340 (403).

On the other hand, if the object designated in the link by the left-click operation (401) is of a type that is not available for inline display by the Web browser, a file download dialogue is displayed. In this case, when the file download dialogue is displayed, the dialogue operation monitoring module 340 detects a dialogue operation event (404), requests for provision of post-transition URL information from the browser monitoring module 330, and then obtains the post-transition URL information from the browser monitoring module 330 (405).

When the save button is clicked in the file download dialogue, the dialogue operation monitoring module 340 obtains a save location file name from information displayed in the dialogue (information as a result of processing by the OS 207) and obtains a full path as save location information about the file (406). Furthermore, if a server included in the post-transition URL obtained in step 405 is the in-house server 116, the dialogue operation monitoring module assigns an identifier indicating the source to the file (407). This identifier can be realized by using a "substitute stream" if the local file system 204 used by the client PC 121 is an NTFS (NT File System) by Microsoft.

Figure 5:
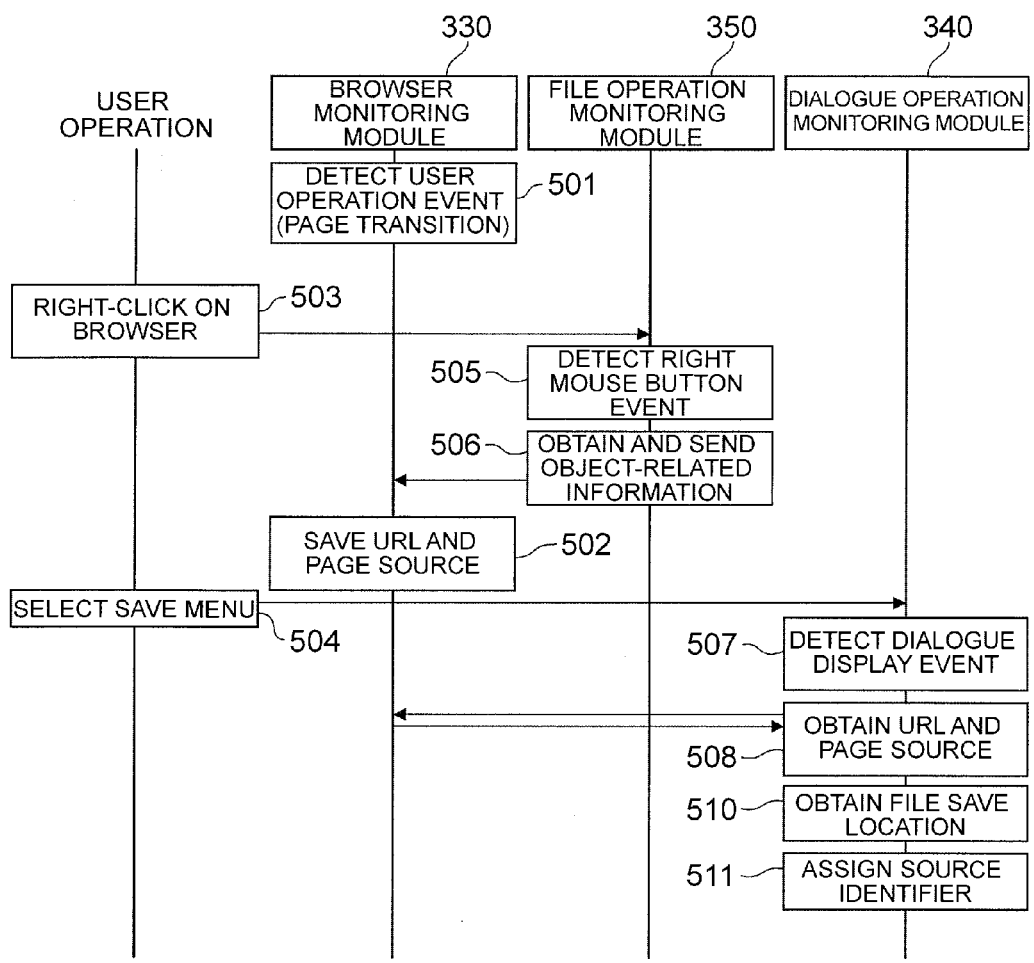
FIG. 5 is a diagram showing an example of a sequence executed by the user's operation, the dialogue operation monitoring module, the browser monitoring module, and a file operation monitoring module when importing a file by means of the Web browser.

FIG. 5 shows an example of a sequence illustrating a flow of processing executed by the browser monitoring module 330, the dialogue operation monitoring module 340, and the file operation monitoring module 350 when the user downloads a file by means of the Web browser.

When the user has the Web browser display a page, the browser monitoring module 330 detects a user operation event for page transition (501). When this happens, the Web browser can retain the post-transition URL and the page source and deliver them in response to a request from the browser monitoring module 330. If the user performs a right-click operation (503) in a link displayed on the Web browser in the above-described state, a mouse operation event occurs and the file operation monitoring module 350 detects the event (505).

The file operation monitoring module 350, which has detected the occurrence of the mouse operation event, saves information relating to the position where the mouse operation event occurred on the Web browser, as object-related information and sends it to the browser monitoring module 330 (506).

Every time a page is displayed on the Web browser, the browser monitoring module 330 saves the URL of the post-transition page and the page source (502).

When an item relating to "file saving" is selected from the displayed context menu by the user's right click (504), a file save dialogue is displayed.

When the dialogue operation monitoring module 340 detects the dialogue display event (507), it obtains the URL of the displayed page and the page source (page data) from the browser monitoring module 330 (508) and further obtains a file path where the file is saved (510). Then, if a server included in the URL of the file is the in-house server 116, the dialogue operation monitoring module 340 recognizes that the source for the file is not a monitoring object, and assigns an identifier indicating the source to the file (511).

Figure 6:
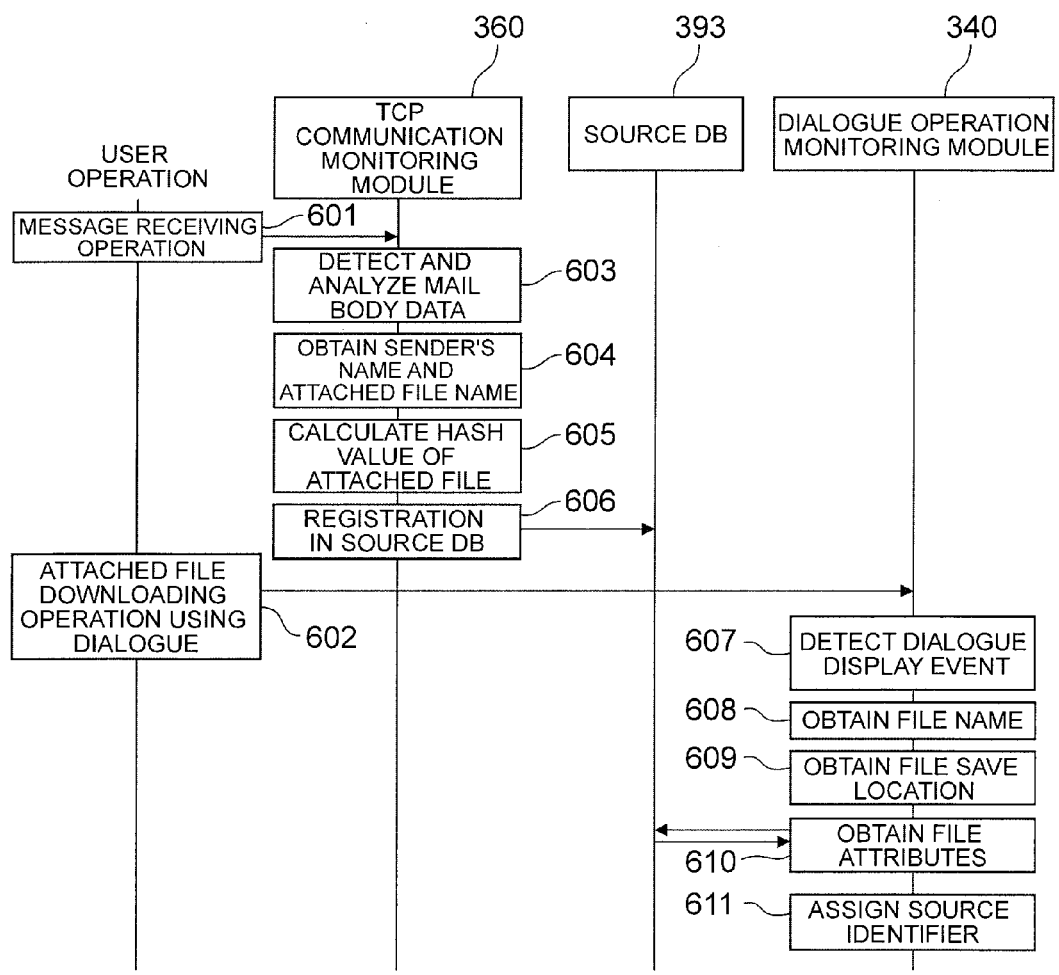
FIG. 6 is a diagram showing an example of a sequence executed by the user's operation, the dialogue operation monitoring module, and a TCP communication monitoring module when importing a file by means of a mailer.

FIG. 6 shows an example of a sequence illustrating a flow of processing executed by the TCP communication monitoring module 360 and the dialogue operation monitoring module 340 when the user saves a file attached to mail in the system 204 by means of the mailer.

If the user performs a message receiving operation such as activation of the mailer or execution of a mail display operation (601), a message is downloaded from the mail server 114 according to protocol such as POP (Post Office Protocol) 3 or IMAP (Internet Message Access Protocol) 4. Then, the TCP communication monitoring module 360, which monitors a socket in a network driver or TCP/IP protocol stack, executes processing for analyzing mail body data (603) and obtains a sender's name and attached file name in the relevant message (604).

Furthermore, the TCP communication monitoring module 360 decodes attached file data, which is encoded by, for example, Base64, and calculates a hash value (605). The TCP communication monitoring module 360 registers the attached file name and the hash value obtained in step 604 and step 605, and the sender's name of the attached file in the source DB 393 (606).

While the user is viewing the mail body using the mailer, he/she may execute an operation to save the attached file in the local file system 204 (this operation may sometimes be executed not immediately after downloading the mail data, but after the elapse of a considerable amount of time after downloading the mail data). When the mailer performs an operation to save the attached file by using a file save dialogue (602), the dialogue operation monitoring module 340 detects the dialogue display event (607) and obtains a file name from information displayed in the dialogue (608), and obtains a full path for the file save location (609). Furthermore, the dialogue operation monitoring module 340 searches the source DB 393, using the file name displayed in the dialogue as a key and obtains file attributes such as a file sender's name (610).

If the attached file name is a general name like "specification.doc," it is possible that a plurality of records may be registered in the source DB 393. In such case, the file sender's name can be obtained by calculating a hash value for the file with the save location file name obtained in the step 608 and searching the source DB 393 by using the hash value as a key.

If it is found in step 610 that the sender of the file is another user within the same organization, the dialogue operation monitoring module 340 assigns an identifier indicating the source to the file (611).

Figure 7:
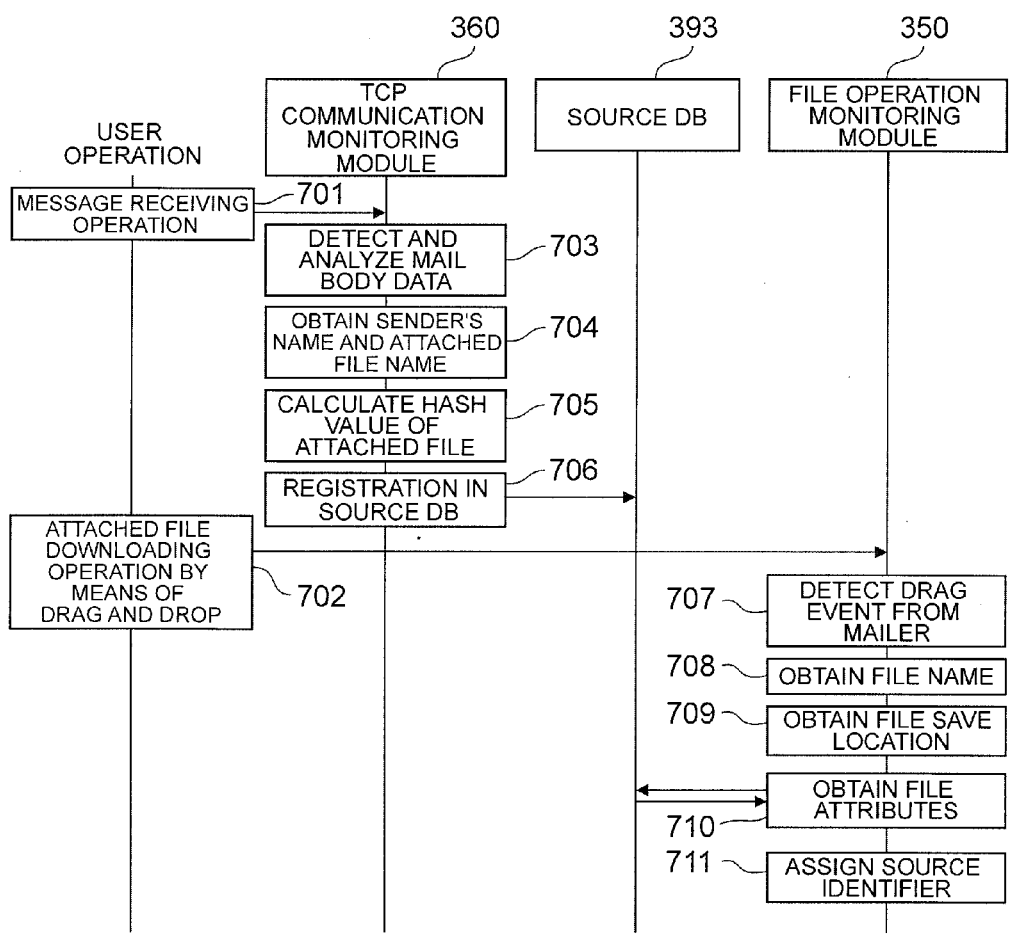
FIG. 7 is a diagram showing an example of a sequence executed by the user's operation, the file operation monitoring module, and the TCP communication monitoring module when importing a file by means of the mailer using drag and drop.

FIG. 7 shows an example of a sequence illustrating a flow of processing executed by the TCP communication monitoring module 360 and the file operation monitoring module 350 when the user saves a file attached to mail in the local file system 204 by means of the mailer.

The processing from step 701 to step 706 is identical to the sequence in FIG. 6 (from step 601 to step 606). Examples of the operation performed by the user to save the attached file in the local file system 204 while viewing the mail body by means of the mailer include not only a method of using the file save dialogue, but also a method of dragging and dropping an icon representing the attached file, which is displayed on a screen for the mailer, to the desktop or the file explorer.

When the above-described operation is performed, the file operation monitoring module 350 detects a drag and drop event from the mailer screen, using the mouse (707). Furthermore, the file operation monitoring module 350 monitors a file generation event in the file system, obtains the name of the file generated in the local file system 204 (708) in response to the drag and drop operation using the mouse, also obtains the full path (709), searches the source DB 393 by using the file name and a hash value of the file as keys, and obtains attributes of the file such as a sender's name (710). If it is found in step 710 that the sender of the file is another user within the same organization, the file operation monitoring module 350 assigns an identifier indicating the source to the file (711).

Next, a sequence for implementing the second means for detecting the user's export operation on the client PC, checking an identifier indicating import, and issuing an alert will be explained with reference to FIG. 8 to FIG. 11.

Figure 8:
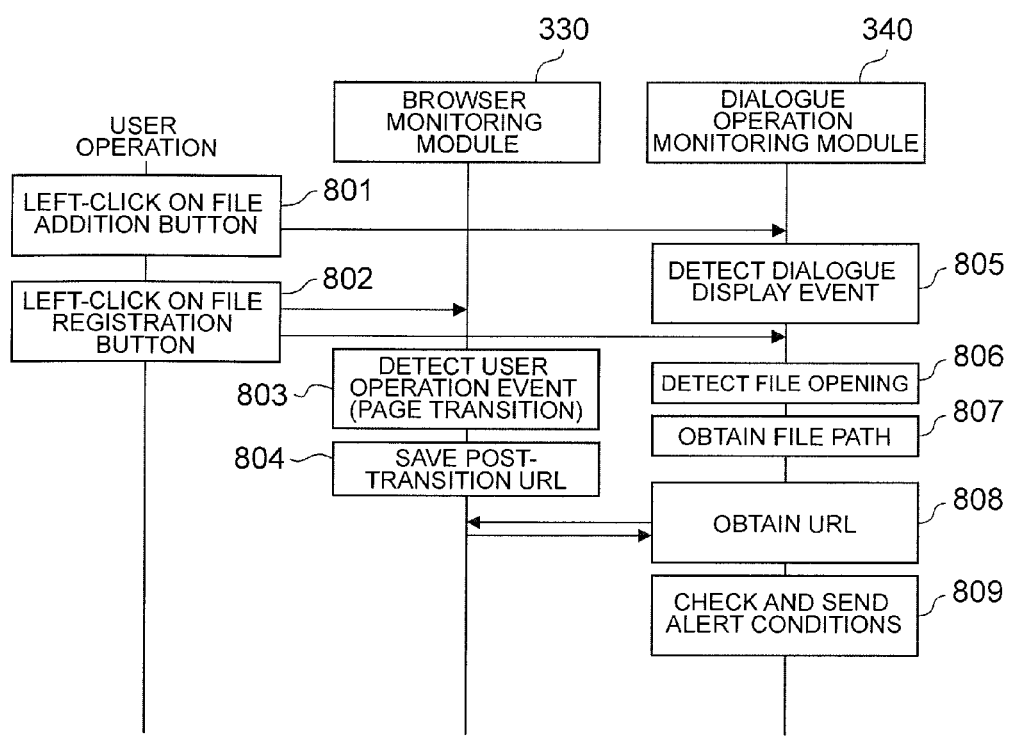
FIG. 8 is a diagram showing an example of a sequence executed by the user's operation, the dialogue operation monitoring module, and the browser monitoring module when exporting a file by means of the Web browser.

FIG. 8 shows an example of a sequence illustrating a flow of processing executed by the browser monitoring module 330 and the dialogue operation monitoring module 340 when the user uploads a file by means of the Web browser.

When the user clicks a button to add a file to be uploaded on a form screen used for file uploading, which is displayed on the Web browser (801), the Web browser displays a file selection dialogue. The dialogue operation monitoring module 340 detects an event where the file selection dialogue is displayed, obtains the name of a selected file, and starts monitoring opening of the file (805).

After the user selects the file using the file selection dialogue and clicks a file registration button on the form screen (802), the screen displayed on the Web browser makes the transition from the form screen to a screen showing the state of file registration.

The browser monitoring module 330 detects a page transition event that occurs as the result of the above transition (803) and saves a post-transition URL (804).

If the file is uploaded, the dialogue operation monitoring module 340 detects file opening of the relevant file (806) and obtains a file path for the file from the OS 207 (807).

Furthermore, the dialogue operation monitoring module 340 obtains the post-page-transition URL from the browser monitoring module 330 and judges whether the output destination for the file is an inspection object or not. If the Web server to which the file is uploaded is an external server outside the organization, the dialogue operation monitoring module 340 recognizes that the output destination for the file is an inspection object, and then checks the identifier indicating the source for the file. If the file has been copied from the file server 115 inside the organization, or has been downloaded from the in-house server 116, or has been attached to and obtained from the mailer, the dialogue operation monitoring module 340 executes processing for issuing an alert (809).

The processing for issuing an alert is processing for generating an alert stating that the condition for the unauthorized operation is satisfied, and sending the alert to the management server 111 by recognizing output information (file) which is output from the client PC 121 is information generated by the unauthorized operation, where the output destination for the output information which is output from the client PC 121 (for example, the Web server to which the file is uploaded) is the external Web server 131, that is, an inspection object which is not a management object of the management server 111, and the output information which is output from the client PC 121 (for example, a file processed by the client PC 121) is a file which has been copied from the file server 115 within the same organization, a file which has been downloaded from the in-house server 116, or a file which has been attached to and obtained from the mailer, and the source for the file is a management object of the management server 111.

In this case, the management server 111 recognizes that the unauthorized operation having a high risk of causing an information leakage accident is detected; and then manages information associated with the unauthorized operation as information that should be processed with the alert. As a result, the administrator can take measures to inhibit information leakage based on the alert collected in the management server 111.

Figure 9:
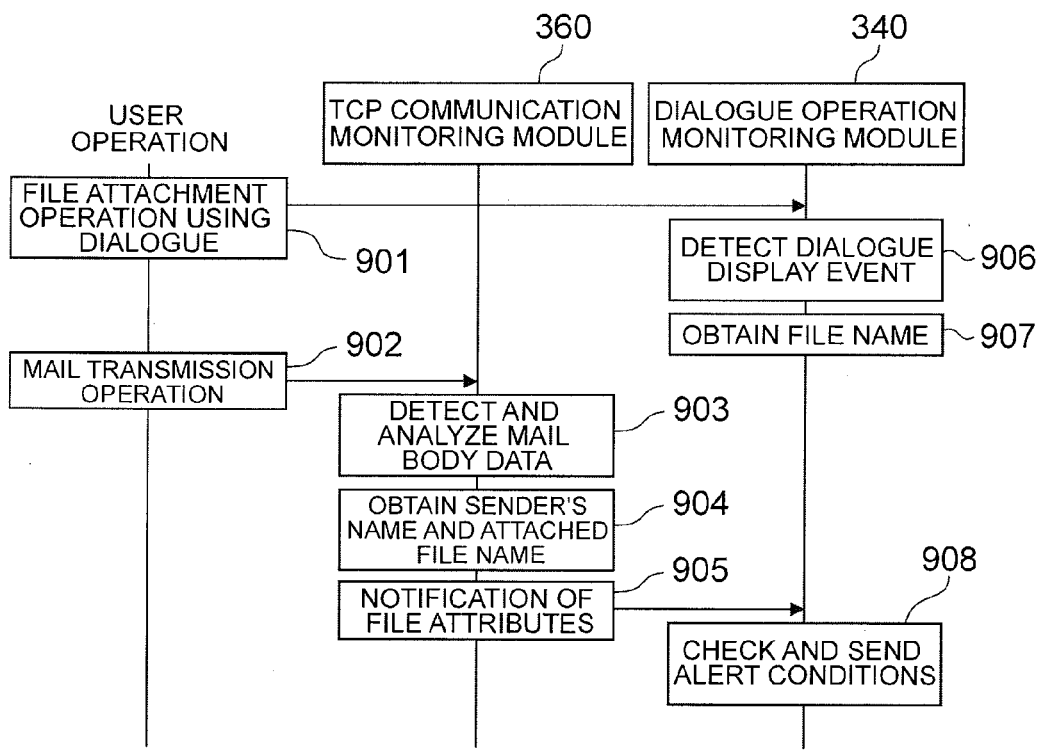
FIG. 9 is a diagram showing an example of a sequence executed by the user's operation, the dialogue operation monitoring module, and the TCP communication monitoring module when exporting a file by means of the mailer.

FIG. 9 shows an example of a sequence illustrating a flow of processing executed by the TCP communication monitoring module 360 and the dialogue operation monitoring module 340 when the user sends mail with an attached file by means of the mailer.

When the user performs a file attachment operation by using a file selection dialogue while creating mail to be transmitted by means of the mailer (901), the dialogue operation monitoring module 340 detects a file selection dialogue display event (906), obtains the name of the selected file and the full path for the file (907), and waits for the mail to be sent.

Subsequently, after the user executes a mail transmission operation by means of the mailer (902), the TCP communication monitoring module 360 analyzes data sent according to SMTP (Simple Mail Transfer Protocol) (903) and obtains the addressee and the attached file name (904).

If a file is attached to the transmitted mail and the addressee is outside the organization, the TCP communication monitoring module 360 notifies the waiting dialogue operation monitoring module 340 that the mail has been transmitted to the addressee outside the organization (905).

The dialogue operation monitoring module 340 checks the identifier indicating the source for the transmitted file. If the file has been copied from the file server inside the organization, or has been downloaded from the in-house Web server, or has been attached to and obtained from the mailer, the dialogue operation monitoring module 340 executes processing for issuing an alert (908).

Figure 10:
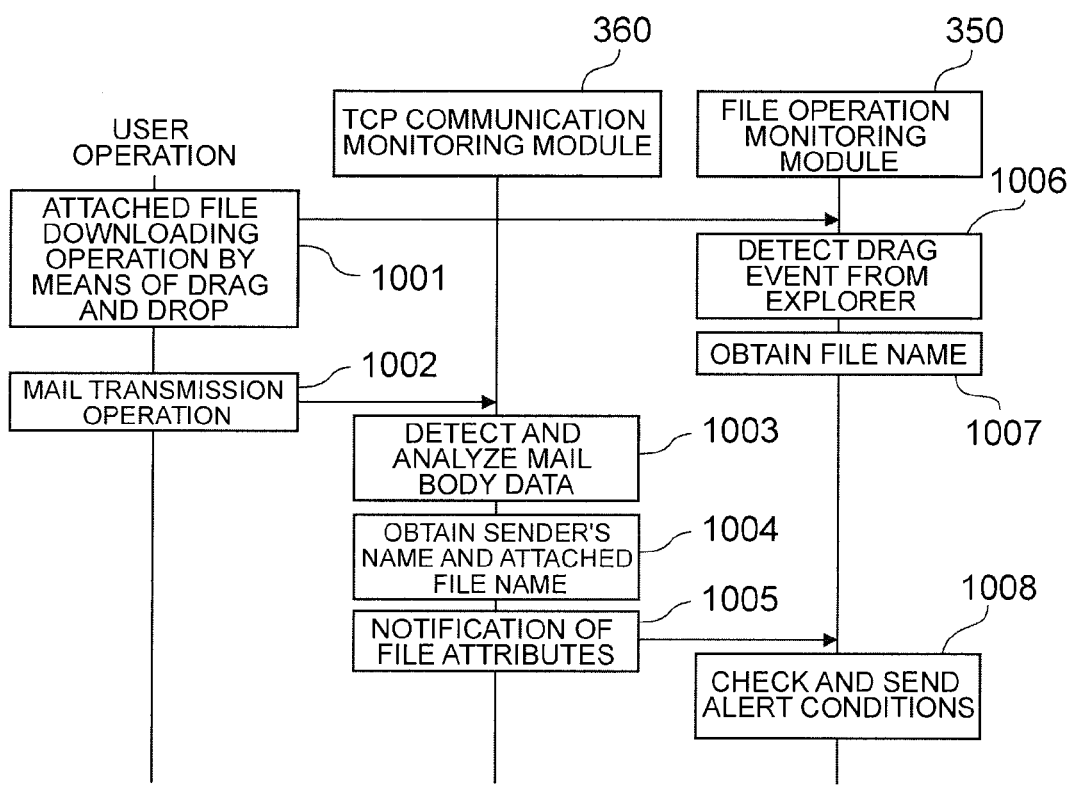
FIG. 10 is a diagram showing an example of a sequence executed by the user's operation, the file operation monitoring module, and the TCP communication monitoring module when exporting a file by means of the mailer using drag and drop.

FIG. 10 shows an example of a sequence illustrating a flow of processing executed by the TCP communication monitoring module 360 and the file operation monitoring module 350 when the user sends mail with an attached file by means of the mailer.

When the user performs a file attachment operation by using drag and drop while creating mail to be transmitted by means of the mailer (1001), the file operation monitoring module 350 detects that a file has been dragged from, for example, the file explorer and dropped to a window for the mailer (1006), obtains the name of the selected file and the full path for the file (1007), and waits for the mail to be sent.

Subsequently, after the user executes a mail transmission operation by means of the mailer (902), the TCP communication monitoring module 360 analyzes data sent according to the protocol SMTP (1003) and obtains the addressee and the attached file name (1004).

If a file is attached to the transmitted mail and the addressee is outside the organization, the TCP communication monitoring module 360 notifies the waiting dialogue operation monitoring module 340 that the mail has been transmitted to the addressee outside the organization (1005).

The file operation monitoring module 350 checks the identifier indicating the source for the transmitted file. If the file has been copied from the file server inside the organization, or has been downloaded from the in-house Web server, or has been attached to and obtained from the mailer, the file operation monitoring module 350 executes processing for issuing an alert (1008).

Figure 11:
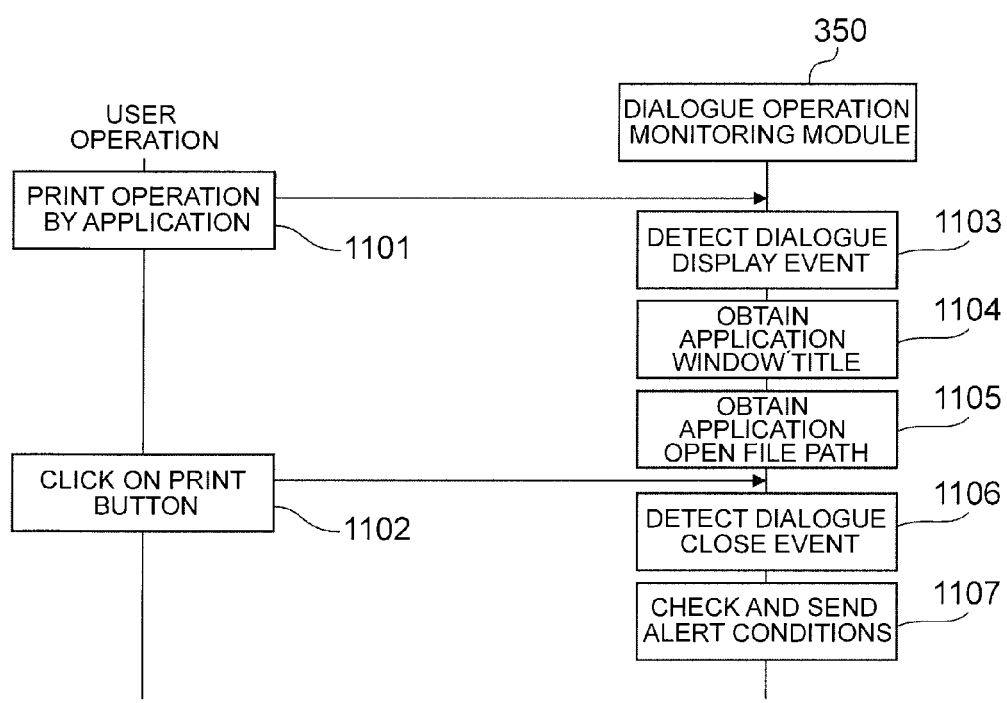
FIG. 11 is a diagram showing an example of a sequence executed by the user's operation and the dialogue operation monitoring module when printing a file.

FIG. 11 shows an example of a sequence illustrating a flow of processing executed by the dialogue operation monitoring module 340 when the user performs a print operation by means of an application.

When the user performs a print operation by means of the application (1101), the dialogue operation monitoring module 340 detects a print dialogue display event (1103), obtains a window title of the application for executing print (1104), opens the application, and obtains the full path for a file to be printed (1105).

Subsequently, after the user clicks a print button in the print dialogue (1102), the dialogue operation monitoring module 340 detects that the dialogue is closed (1206); and checks the identifier indicating the source for the transmitted file. If the file has been copied from the file server inside the organization, or has been downloaded from the in-house Web server, or has been attached to and obtained from the mailer, the dialogue operation monitoring module 340 executes processing for issuing an alert (1107).

Figure 12:
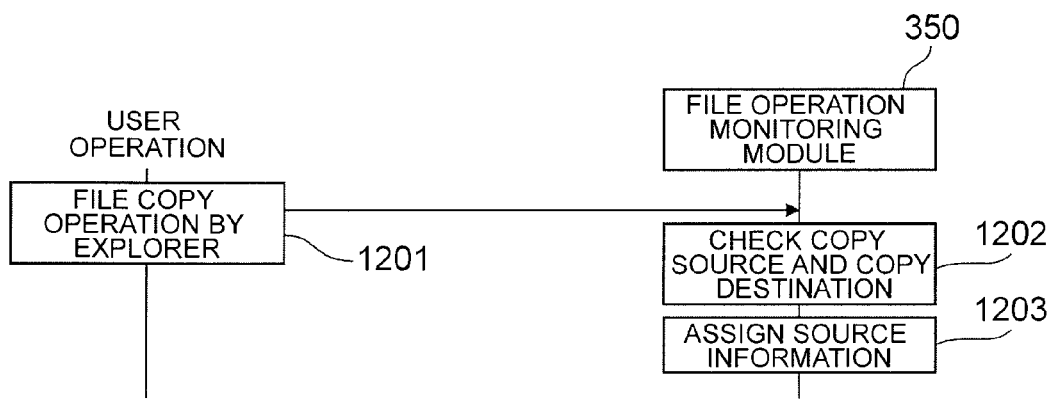
FIG. 12 is a diagram showing an example of a sequence executed by the user's operation and the file operation monitoring module when importing a file from a file server and exporting the file to a removable medium.
Figure 12:
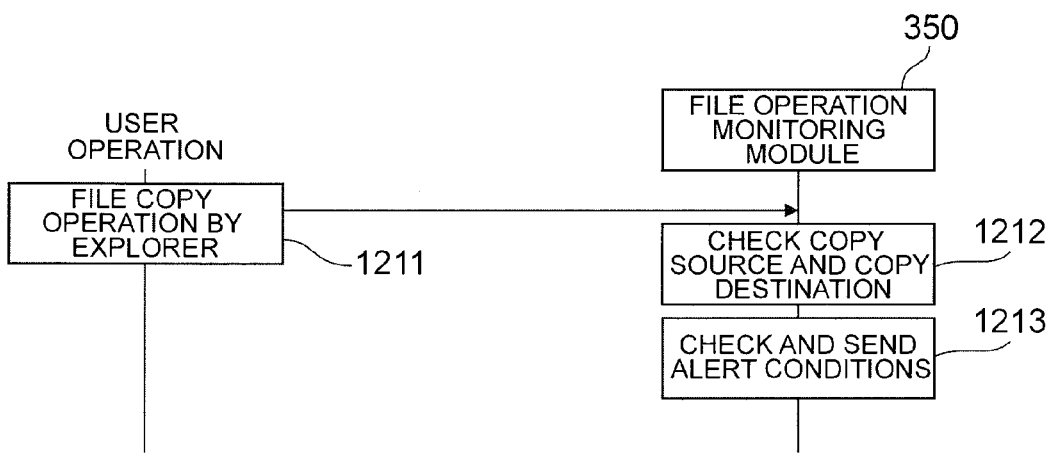

FIG. 12 shows an example of a sequence for implementing the first means by execution of processing by the file operation monitoring module 350 when the user copies information in the file server 115 to the local file system 204 by means of the file explorer; and also shows an example of a sequence for implementing the second means by execution of processing by the file operation monitoring module 350 when the user copies a file to a removable medium by means of the file explorer.

When the user performs a file copy or movement operation by using the file explorer (1201), the file operation monitoring module 350 executes processing for specifying a copy source and copy destination for the file (1202). If the copy source is the file server 115 and the copy destination is the client PC 121, the file operation monitoring module 350 assigns an identifier indicating the source for the operation target file to that file (1203).

On the other hand, when the user performs a file copy or movement operation by using the file explorer (1211), the file operation monitoring module 350 executes processing for specifying a copy source and copy destination for the file (1212). If the copy source is the local file system 204 for the client PC 121 and the copy destination is a removable medium coupled to the client PC 121, the file operation monitoring module 350 checks an identifier indicating the source for the operation target file. If the file has been copied from the file server inside the organization, or has been downloaded from the in-house Web server, or has been attached to and obtained from the mailer, the file operation monitoring module 350 executes processing for issuing an alert (1213).

FIG. 13 shows an example of the format of the source DB 393 used to store information about received mail and a source-indicating identifier 1311 assigned to a file 209 stored in the local file system 204.

The source DB 393 includes a field 1301 storing the file name, a field 1302 storing a sender's name of the relevant mail, and a field 1303 storing a hash value of the file described in the field 1301.

If the NTFS by Microsoft is used as mentioned with reference to FIG. 5, the source-indicating identifier 1311 can be realized as data of an ini file format, using a "substitute stream." If the file has been obtained from the mail server 114, the mail address of a sender is described in the "From" line; and if the file has been obtained from the file server 115, a server name or an IP address of the file server is described in the "Server" line; and if the file has been obtained from the in-house Web server, an URL indicating the obtained file is described in the "URL" line. An unused line(s) may be erased or the area on the right side of the equal sign may be left blank.

According to this invention, the content included in the source-indicating identifier 1311 can be issued as an alert by the second means. By including information import time to the client PC 121 in the source-indicating identifier 1311 in the first means, not only information indicating from where the exported information was obtained, but also information indicating when it was obtained can be included in the alert.

In order to realize the acquisition of the import time information as described above, a field for storing time of mail reception including an attached file may be added to the fields in the source DB 393; and the TCP communication monitoring module 360 may also register the reception time described in the mail header in the source DB 393 in steps 606, 706 and may also obtain the content of the time information field in steps 610, 710, where the file attributes are obtained, and assign the time information to the source-indicating identifier 1311.

Figure 14:
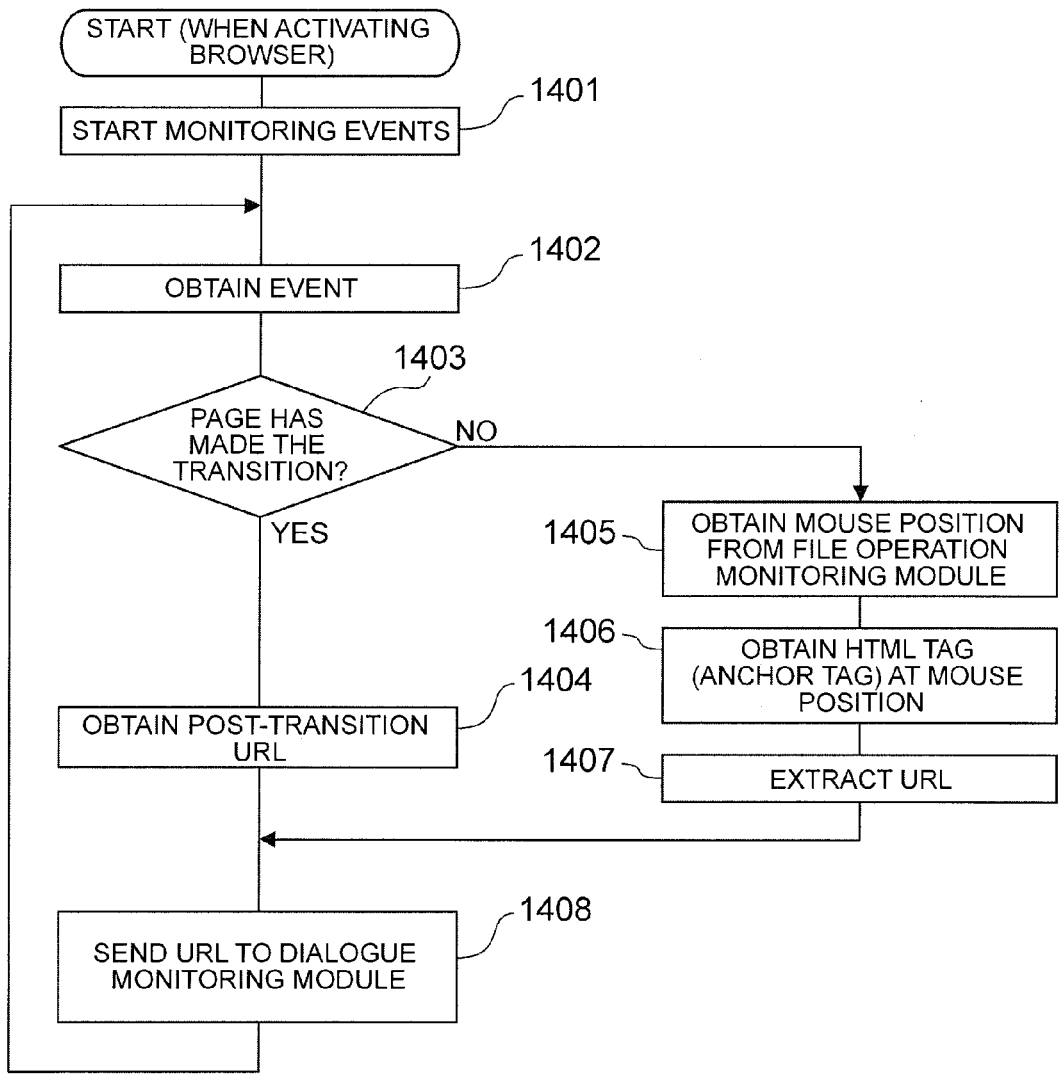
FIG. 14 is a diagram showing an example of a flowchart illustrating processing sequence executed by the browser monitoring module which is a module in the agent.

FIG. 14 shows an example of a flowchart illustrating the outline of processing executed by the browser monitoring module 330.

The browser monitoring module 330 is activated when the Web browser is activated; and the browser monitoring module 330 makes settings to monitor the user operation events on the Web browser as explained with reference to FIG. 4, FIG. 5, and FIG. 8 (1401) and enters a loop to judge whether an event has occurred or not (1402). If the occurrence of an event is detected, the browser monitoring module 330 judges whether or not a page has made the transition to another page as a result of the user's left-click operation (1403).

If the user's left-click operation has caused the page to make the transition to another page, the browser monitoring module 330 executes step (1404) for obtaining a post-transition URL and then executes step (1408) for sending the URL to the dialogue monitoring module 340.

On the other hand, if the page has not made the transition to another page, the browser monitoring module 330 executes step (1405) for obtaining coordinate information on the browser regarding mouse events from the file operation monitoring module 350, executes step (1406) for obtaining an HTML anchor tag located under the mouse cursor, executes step (1407) for extracting the URL selected with the mouse cursor, and then executes step (1408) for sending the URL to the dialogue monitoring module 340.

Figure 15:
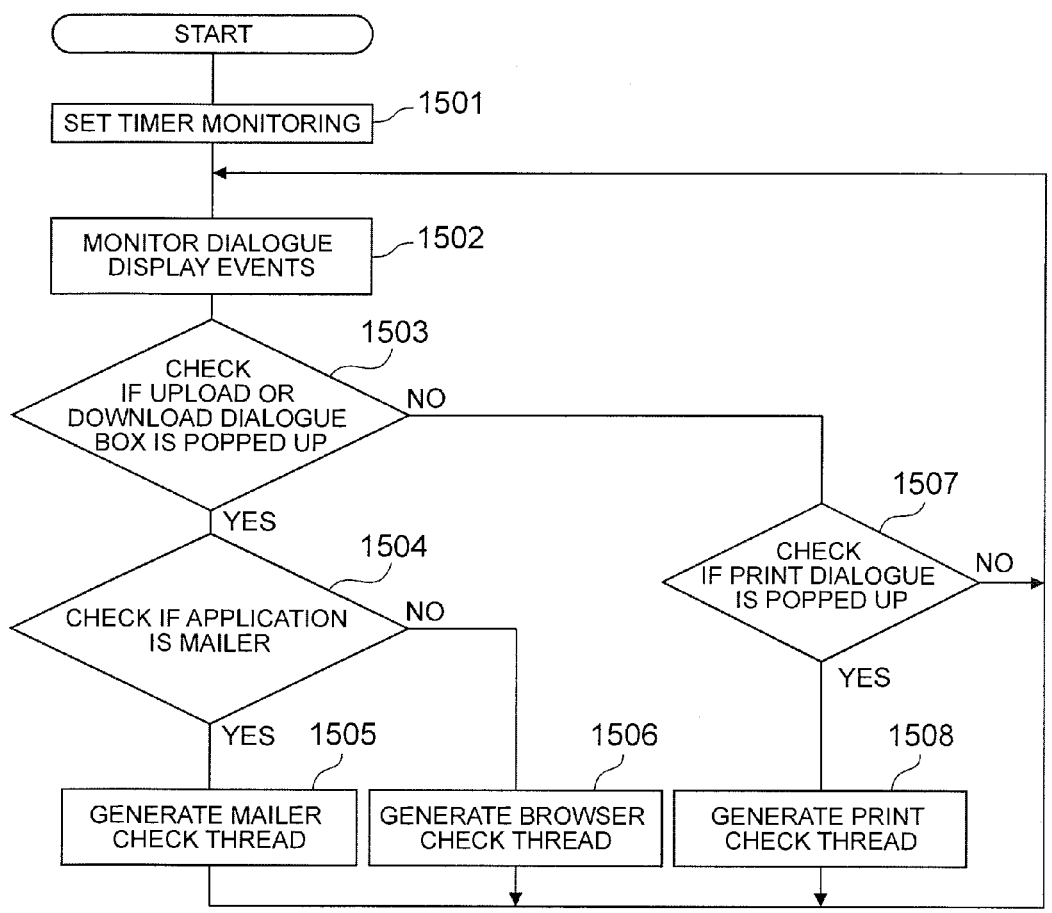
FIG. 15 is a diagram showing an example of the whole image of a flowchart illustrating processing executed by the dialogue operation monitoring module which is a module in the agent.

FIG. 15 shows an example of a flowchart illustrating the outline of processing executed by the dialogue operation monitoring module 340.

The dialogue operation monitoring module 340 is activated when the user logs on to the client PC 121; and the dialogue operation monitoring module 340 monitors the file operations using the dialogues explained with reference to FIG. 4, FIG. 5, FIG. 6, FIG. 8, FIG. 9, and FIG. 11. For example, after setting up timer monitoring or similar (1501), the dialogue operation monitoring module 340 monitors an event for which a dialogue is displayed (1502).

If an event occurs, the dialogue operation monitoring module 340 checks if the upload dialogue or the download dialogue is displayed (1503). If the dialogue is displayed, the dialogue operation monitoring module 340 judges the type of an application displaying the dialogue (1504). If the application is the mailer, the dialogue operation monitoring module 340 executes step (1505) for generating a mailer check thread; and if the application is the Web browser, the dialogue operation monitoring module 340 executes step (1506) for generating a Web browser check thread.

If it is determined in step 1503 that the displayed dialogue is neither the upload nor download dialogue, the dialogue operation monitoring module 340 judges whether it is a print dialogue or not (1507), and then executes step (1508) for generating a print check thread.

After executing each step for generating the relevant thread, the dialogue operation monitoring module 340 returns to step (1502) for monitoring an event for which a dialogue is displayed.

Figure 16:
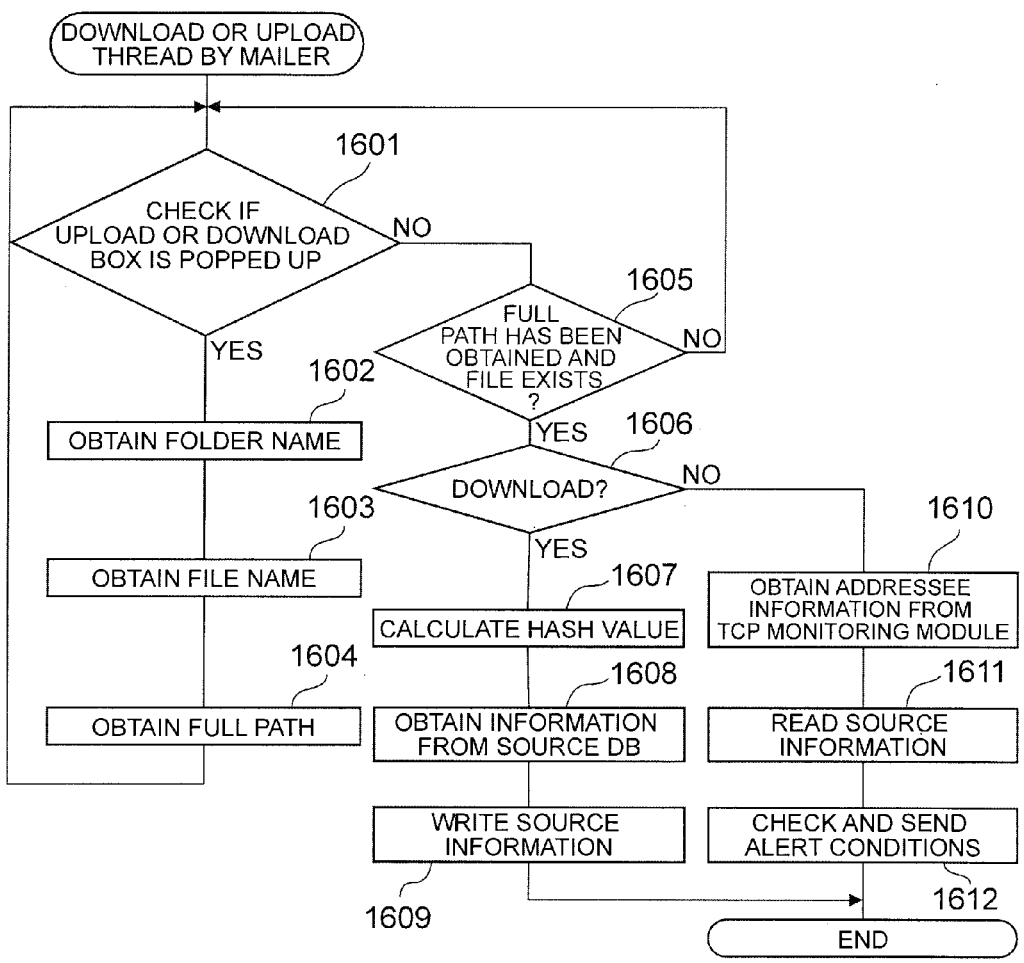
FIG. 16 is a diagram showing an example of a flowchart of a download or upload thread portion executed by the mailer for the dialogue operation monitoring module which is a module in the agent.

FIG. 16 shows an example of a flowchart illustrating the outline of the mailer check thread during the processing executed by the dialogue operation monitoring module 340.

In this thread, the dialogue operation monitoring module 340 checks whether the upload dialogue or download dialogue is displayed (1601). If the dialogue is displayed, the dialogue operation monitoring module 340 obtains a folder name (1602) and a file name (1603) from a character string displayed in the dialogue, configures a full path for the target file to be uploaded or downloaded (1604), and then returns to step 1601.

Subsequently, when the user clicks, for example, a save button in the dialogue and the dialogue is no longer displayed, the dialogue operation monitoring module 340 executes processing in step 1605 and subsequent steps.

Firstly, the dialogue operation monitoring module 340 judges whether or not step 1604 has already been executed, the full path thereby exists, and a file indicated by the full path exists (1605). If the file exists, the dialogue operation monitoring module 340 executes processing in step 1606 and subsequent steps; and if the file does not exist, the dialogue operation monitoring module 340 returns to step 1601.

If the file exists, the dialogue operation monitoring module 340 firstly judges whether the dialogue is the download dialogue or not (1606). If the dialogue is the download dialogue, the dialogue operation monitoring module 340 calculates a hash value of the file specified in step 1604 (1607) and searches for the information registered in the source DB by the TCP communication monitoring module 360 as explained with reference to FIG. 6 and FIG. 7 (1608). If the condition that, for example, the source is another user within the same organization is satisfied, the dialogue operation monitoring module 340 writes the source information to the file indicated by the full path obtained in step 1604 (1609).

If the dialogue is the upload dialogue, the dialogue operation monitoring module 340 waits for notification from the TCP communication monitoring module 360 as explained with reference to FIG. 9 and FIG. 10 (1610). If the mail to which the file designated by the dialogue is attached is transmitted, the dialogue operation monitoring module 340 reads the source information about the file indicated by the full path for the attached file as obtained in step 1604 (1611), checks the alert conditions, generates an alert, and sends the alert to the management server 111 as the need arises (1612).

Figure 17:
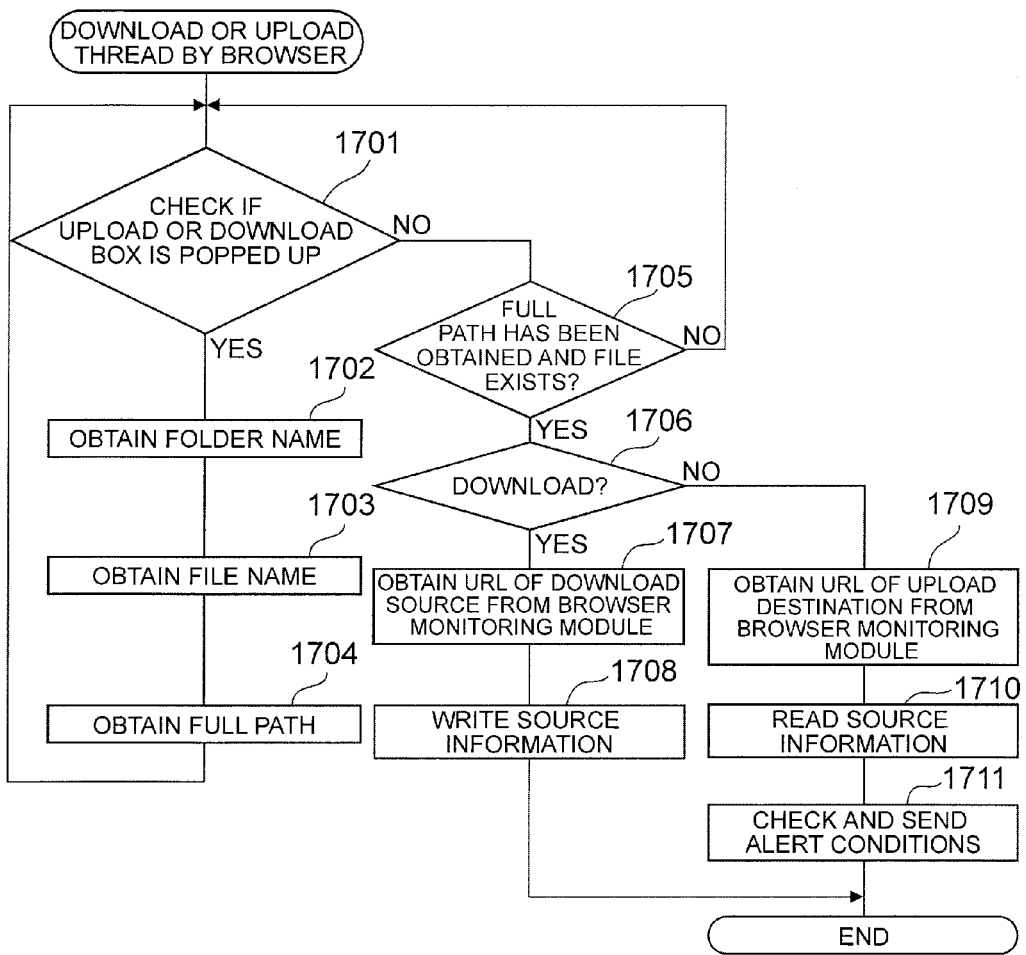
FIG. 17 is a diagram showing an example of a flowchart of a download or upload thread portion executed by the browser for the dialogue operation monitoring module which is a module in the agent.

FIG. 17 shows an example of a flowchart illustrating the outline of the Web browser check thread during the processing executed by the dialogue operation monitoring module 340.

In this thread, the dialogue operation monitoring module 340 checks whether the upload dialogue or download dialogue is displayed (1701). If the dialogue is displayed, the dialogue operation monitoring module 340 obtains a folder name (1703) and a file name (1703) from a character string displayed in the dialogue (1702), configures a full path for the target file to be uploaded or downloaded (1704), and then returns to step 1701. Subsequently, when the user clicks, for example, a save button in the dialogue and the dialogue is no longer displayed, the dialogue operation monitoring module 340 executes processing in step 1705 and subsequent steps.

Firstly, the dialogue operation monitoring module 340 judges whether or not step 1704 has already been executed, the full path thereby exists, and a file indicated by the full path exists (1705). If the file exists, the dialogue operation monitoring module 340 executes processing in step 1706 and subsequent steps; and if the file does not exist, the dialogue operation monitoring module 340 returns to step 1701. If the file exists, the dialogue operation monitoring module 340 firstly judges whether the dialogue is the download dialogue or not (1706). If the dialogue is the download dialogue, the dialogue operation monitoring module 340 obtains download source information retained by the browser monitoring module 330 as explained with reference to FIG. 4 and FIG. 5 (1707). If the condition that, for example, the source is another user within the same organization is satisfied, the dialogue operation monitoring module 340 writes the source information to the file indicated by the full path obtained in step 1704 (1708).

If the dialogue is the upload dialogue, the dialogue operation monitoring module 340 obtains upload destination information retained by the browser monitoring module 330 as explained with reference to FIG. 8 from the browser monitoring module 330 (1709). If the file designated by the dialogue is transmitted, the dialogue operation monitoring module 340 reads the source information about the file indicated by the full path for the attached file as obtained in step 1704 (1710), checks the alert conditions, generates an alert, and sends the alert to the management server 111 as the need arises (1711).

Figure 18:
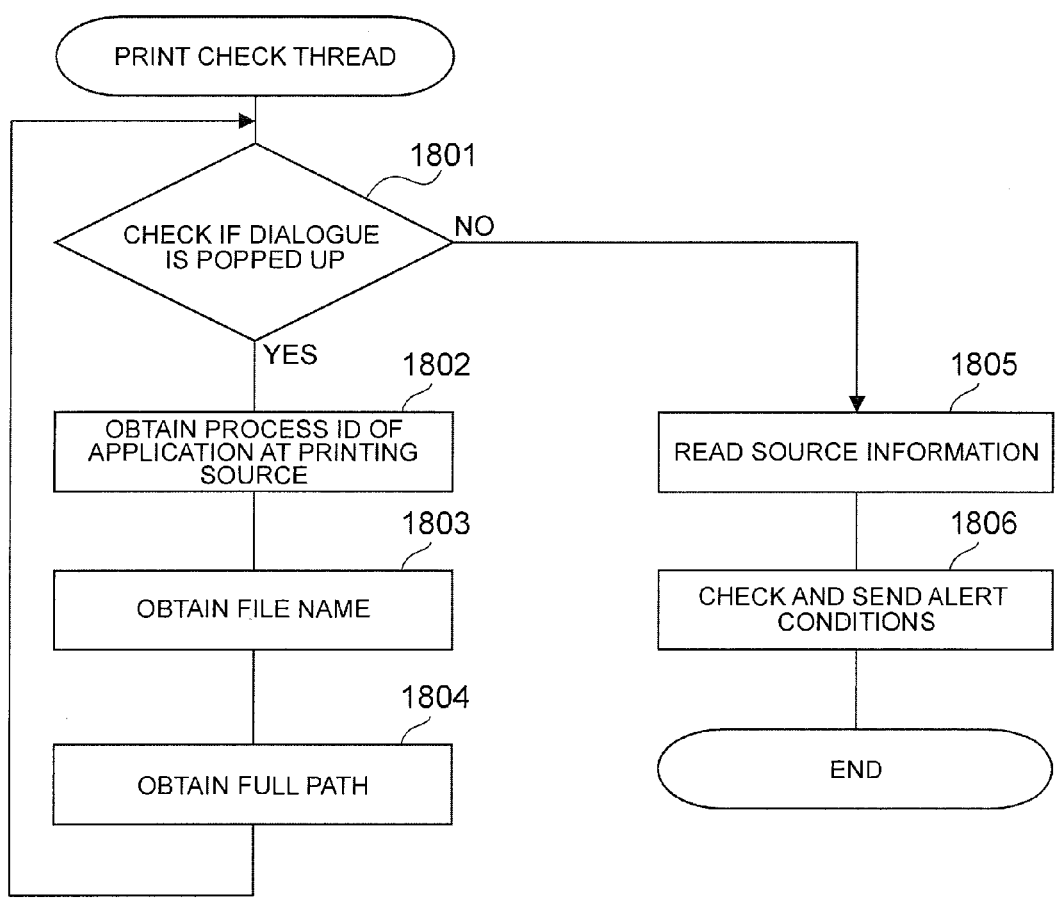
FIG. 18 is a diagram showing an example of a flowchart of a print check thread portion executed by the dialogue operation monitoring module which is a module in the agent.

FIG. 18 shows an example of a flowchart illustrating the outline of the print check thread by an application during the processing executed by the dialogue operation monitoring module 340.

In this thread, the dialogue operation monitoring module 340 checks whether a print dialogue is displayed or not (1801). If the dialogue is displayed, the dialogue operation monitoring module 340 obtains the process ID of the application of a printing source (1802), also obtains the file name from a file list for which the process is opened (1803), configures a full path for the print target file (1804), and then returns to step 1801.

Subsequently, when the user clicks, for example, a print button in the dialogue and the dialogue is no longer displayed, the dialogue operation monitoring module 340 reads source information about the print target file (1805), checks the alert conditions, generates an alert, and sends the alert to the management server 111 as the need arises (1806).

Figure 19:
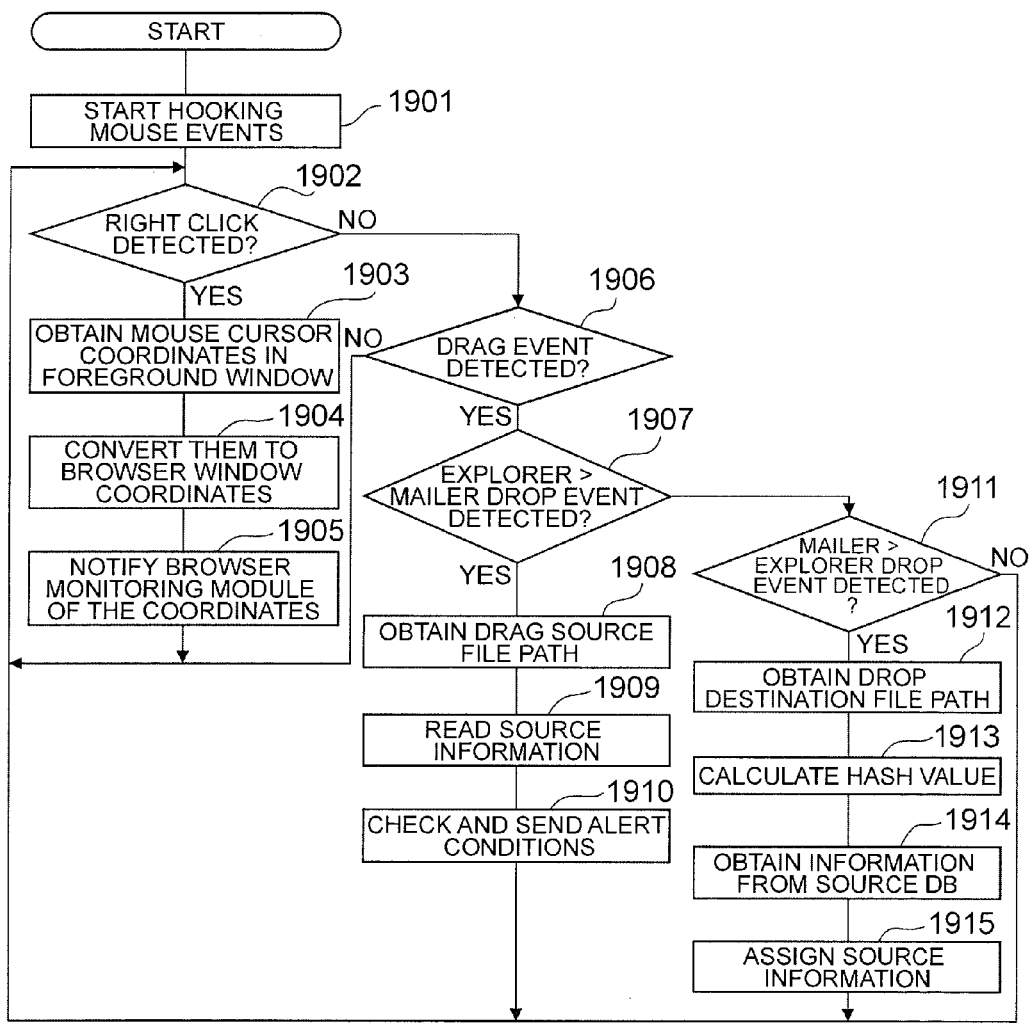
FIG. 19 is a diagram showing an example of a flowchart illustrating processing executed by the file operation monitoring module which is a module in the agent.

FIG. 19 shows an example of a flowchart illustrating the outline of the processing executed by the file operation monitoring module 350.

The file operation monitoring module 350 is activated when the user logs on to the client PC 121. After starting hooking mouse events (1901), the file operation monitoring module 350 monitors file operations using the mouse as explained with reference to FIG. 5, FIG. 7, and FIG. 10. If the file operation monitoring module 350 detects an event, it judges whether the detected mouse operation event is right-click or not (1902).

In a case of the right click, the file operation monitoring module 350 obtains mouse cursor coordinates in a foreground window (1903), executes processing for converting the mouse cursor coordinates into browser window coordinates (1904), executes processing for notifying the browser monitoring module 330 of the coordinates obtained in step 1904 (1905), and returns to the event monitoring.

On the other hand if it is determined in step 1902 that the mouse operation event is not the right click, the file operation monitoring module 350 executes processing for judging whether it is a drag event or not (1906). If it is not the drag event, the processing returns to the event monitoring.

If the event is the drag event, the file operation monitoring module 350 detects an event of dropping the dragged object and judges whether or not the relevant object has been dragged on the file explorer and dropped on the mailer (1907).

If a negative judgment is returned in step 1907, the file operation monitoring module 350 returns to the event monitoring; and if an affirmative judgment is returned in step 1907, the file operation monitoring module 350 obtains a file path for the source from which the relevant object has been dragged (1908), reads source information about the file indicated by the full path of the attached file as obtained in step 1908 (1909), checks the alert conditions, and then sends the alert to the management server 111 as the need arises (1910).

If it is determined in step 1907 that the destination to which the relevant object has been dropped is not the mailer, the file operation monitoring module 350 judges whether or not the drag and drop event has been dragged on the mailer and dropped on the file explorer (1911).

If a negative judgment is returned in step 1911, the file operation monitoring module 350 returns to the event monitoring; and if an affirmative judgment is returned in step 1911, the file operation monitoring module 350 obtains a file path for the destination to which the relevant object has been dropped (1912). Next, the file operation monitoring module 350 calculates a hash value of the file obtained in step 1912 (1913) and searches for the information registered in the source DB (1914). If the condition that, for example, the source is another user within the same organization is satisfied, the file operation monitoring module 350 writes the source information to the file indicated by the full path obtained in step 1912 (1915).

Incidentally, regarding the processing by the file operation monitoring module 350 with respect to the sequence shown in FIG. 12, processing corresponding to step 1912 and step 1915 may be executed in a case where the relevant object has been dragged from the file server 115 and dropped to the local file system 204; and processing corresponding to step 1908 and 1910 may be executed in a case where the relevant object has been dragged from the local file system 204 and dropped to a removable medium.

Also, if the relevant object has been dragged from the file server 115 and dropped to a removable medium, processing corresponding to step 1910 may be executed.

Figure 20:
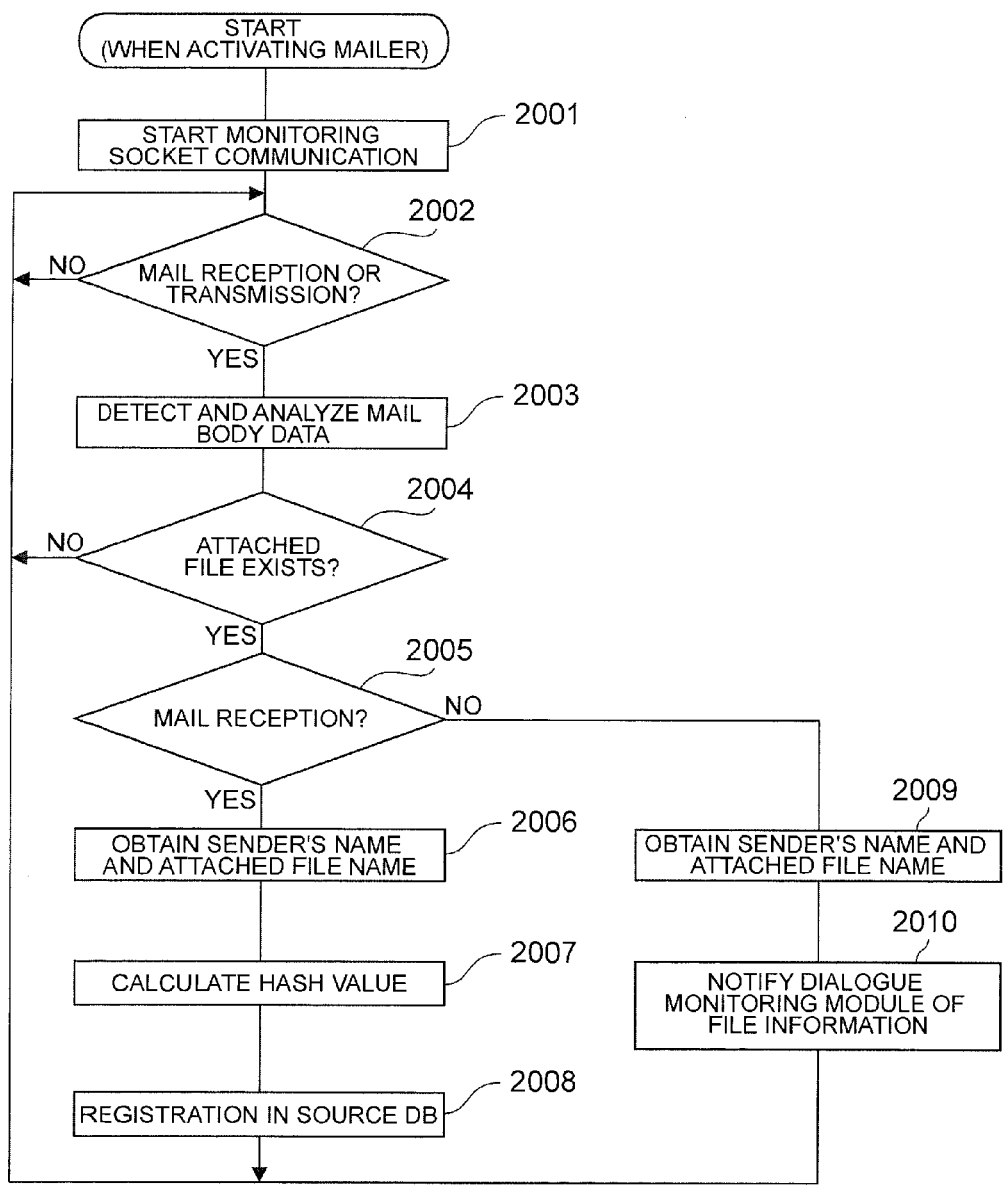
FIG. 20 is a diagram showing an example of a flowchart illustrating processing executed by the TCP communication monitoring module which is a module in the agent.

FIG. 20 shows an example of a flowchart illustrating the outline of processing executed by the TCP communication monitoring module 360.

The TCP communication monitoring module 360 is activated when the user logs on to the client PC 121; and monitors communication data according to each of protocols SMTP, POP3, and IMAP4. The TCP communication monitoring module 360 starts monitoring socket communication (2001) and judges whether the relevant data is data transmitted or received according to the above-mentioned protocols or not (2002). If a negative judgment is returned in step 2002, the processing returns to monitoring of the socket communication; and if an affirmative judgment is returned, processing in step 2003 and subsequent steps is executed.

In step 2003, the TCP communication monitoring module 360 analyzes mail data. When this analysis is performed, the sender or receiver can analyze information such as the file name and whether an attached file exists or not, according to a header area of the mail data by means of analysis of a MIME (Multipurpose Internet Mail Extension) part.

Next, the TCP communication monitoring module 360 identifies whether a file is attached to the relevant mail or not (2004). If the file is attached, the TCP communication monitoring module 360 further judges whether the protocol type is POP3 or IMAP4 for mail reception or SMTP for mail transmission (2005). In the case of the protocol type for mail reception, the TCP communication monitoring module 360 obtains the sender's name and the attached file name (2006). After decoding data of the attached file, the TCP communication monitoring module 360 calculates a hash value (2007), registers it in the source DB 393, and returns to monitoring of the socket communication.

On the other hand, if it is determined in step 2005 that the protocol type is that for mail transmission, the TCP communication monitoring module 360 obtains the sender's name and the attached file name (2009) and sends the information obtained in step 2009 to the dialogue monitoring module 350 and the file monitoring module 360.

As a result of the configuration and processing described above, this system can identify the fact that information (input information) imported from a device, which is not a monitoring object, to the client PC 121 is exported to a device which is an inspection object. Examples of methods for importing information into the client PC 121 are as follows:
(1) downloading by the Web browser;
(2) a file attached to received mail; and
(3) copying and movement from the file server using the file explorer to the local file system 204.

Regarding any of the above-described operations, the source-indicating identifier 1311 including information relating the import source is assigned to the imported information.

In a case of a file system (for example, the NTFS by Microsoft) having a function assigning the source-indicating identifier 1311 to information after processing (including copied information) when each processing of copying, renaming, and movement is executed on information imported within the local file system for the client PC 121, an alert can be issued if any of the following possible information export operations for this system is performed:

(1) file uploading by the Web browser;
(2) transmission of mail with an attached file;
(3) printing by an application; and
(4) copying and movement to removable media.

Conditions for issuing an alert using this system may be determined based on the content of the source-indicating identifier 1311. For example, in a case of information imported by downloading by the Web browser, all the Web servers within the organization may be the targets; and if a Web server storing important information can be identified, the security policy 392 may be set so that a specified Web server should be determined to be the target only if the URL of the specified Web server is included in the source-indicating identifier 1311.

It is also possible to change the conditions for issuing the alert depending on a time zone, during which the export operation is performed, and the types and size of the information.

According to this embodiment, it is possible to detect an operation to import confidential information, which is created by another computer in the same organization, into the client PC 121 used by the user himself/herself and then export it outside the organization as being an unauthorized operation; and an operation that is performed by the user and has a high risk of causing information leakage can be detected as the unauthorized operation.

As a result, it is possible to realize a function issuing an alert to the unauthorized operation having a high risk of information leakage, without making initial settings for issuing an alert when a specified information output operation is performed, or without making initial settings to define an unauthorized operation pattern, in order to detect the user's operation having a high risk of causing information leakage.

Furthermore, information leakage can be prevented by detecting the unauthorized operation having a high risk of causing an information leakage accident and managing information associated with the unauthorized operation as information to be processed with an alert.

[Reference Signs List]
111 Management server
114 Mail server
115 File server
116 In-house server
121 Client PC
122 Agent program
123 Network printer
204 Local file system
310 Process monitoring module
320 Printer monitoring module
330 Browser monitoring module
340 Dialogue operation monitoring module
350 File operation monitoring module
360 TCP communication monitoring module
393 Source DB
1311 Source-indicating identifier

The invention claimed is:

1. A system comprising:
a computer configured to execute at least one application program which stores and accesses a file in the computer, according to user operations; and
a management server configured to manage a monitoring result of a monitoring device,
wherein the computer is configured to:
(1) import first information from a first server computer into the file according to a user importing operation, comprising:
(1a) storing a source identifier designating a source of the first information, in a metadata of the file, wherein the source identifier is acquired by a communication procedure for receiving the first information, according to a communication protocol which is an upper layer protocol relative to TCP (transmission control protocol)/IP (internet protocol) protocol, and
(2) export information in the file to a second server computer, according to a user exporting operation designating the file and exports destination, comprising:
(2a) acquiring the source identifier from the metadata of the file; and
(2b) checking a condition to send an alert to the monitoring server using the source identifier and an identifier of the exports destination.

2. The system according to claim 1,
wherein the at least one application program includes a Web browser,
wherein in (1) and (1a), the computer is configured to:
receive the user importing operation which is a pointed link, or an object in a first Web contents displayed by the Web browser;
save the first information designated by the pointed link or object into the file; and
acquire a source URL (universal resource locator) designated by the pointed link or object, and store the source URL as the source identifier in the metadata of the file, and
wherein in (2), (2a), and (2b), the computer is configured to:
receive the user exporting operation of the designation of a filename of the file on a second Web contents; and
acquire a destination URL of another Web contents which is transmitted from the second Web contents after the user exporting operation, as the identifier of the exports destination.

3. The system according to claim 2,
wherein the source URL is a URL of a Web contents transmitted from the first Web contents and designated by the pointed link.

4. The system according to claim 2,
wherein the at least one application program includes a mail program,
wherein in (1) and (1a), the computer is configured to:
receive a first part of the user importing operation for receiving mail data, and a second part of the user importing operation for saving an attached file of the mail data;
save the attached file into the file;
acquire a sender's address from mail data, and store the sender's address as the source identifier in the metadata of the file, and
wherein in (2), (2a), and (2b), the computer is configured to:
receive the user exporting operation for attaching the file to a new mail, and send the new mail; and
acquire an addressee of the new mail as the identifier of the exports destination.

5. The system according to claim 4,
wherein in (1) and (1a), the computer is configured:
by a program module that is configured to watch TCP connection, to calculate a hash value about the attached file upon receiving the mail data, and to store a combination of the hash value, the sender's address, and a filename of the attached file, to a database which is different area of the metadata of the file; and by another program module configured to detect the second part of the user importing operations for saving the attached file, to acquire the sender's address by comparing:
a filename of the attached filename detected by the another program module, and the filename in the database; and
a hash value calculated by the another program module, and the hash value in the database.

6. A computer system comprising:
a CPU (central processing unit) configured to execute at least one application program which stores and accesses a file in the computer, according to user operations; and
a local file system storing the file,
wherein the CPU is configured to:
(1) import first information from a first server computer into the file according to a user importing operation, with:
   (1a) storing a source identifier designating a source of the first information, in a metadata of the file, wherein the source identifier is acquired by a communication procedure for receiving the first information, according to a communication protocol which is an upper layer protocol relative to TCP (transmission control protocol)/IP (internet protocol) protocol, and
(2) export information in the file to a second server computer, according to a user exporting operation designating the file and exports destination, with:
   (2a) acquiring the source identifier from the metadata of the file; and
   (2b) checking a condition to send an alert to the monitoring server using the source identifier and an identifier of the exports destination.

7. The computer system according to claim 6,
wherein the at least one application program includes a Web browser,
wherein in (1) and (1a), the CPU is configured to:
   receive the user importing operation which is a pointed link or an object in a first Web contents displayed by the Web browser;
   save the first information designated by the pointed link or object into the file; and
   acquire a source URL (universal resource locator) designated by the pointed link or object, and store the source URL as the source identifier in the metadata of the file, and
wherein in (2), (2a), and (2b), the CPU is configured to:
   receive the user exporting operation of the designation of a filename of the file on a second Web contents; and
   acquire a destination URL of another Web contents which is transmitted from the second Web contents after the user exporting operation, as the identifier of the exports destination.

8. The computer system according to claim 7,
wherein the source URL is a URL of a Web contents transmitted from the first Web contents and designated by the pointed link.

9. The computer system according to claim 6,
wherein the at least one application program includes a mail program,
wherein in (1) and (1a), the CPU is configured to:
   receive a first part of the user importing operation for receiving mail data, and a second part of the user importing operation for saving an attached file of the mail data;
   save the attached file into the file;
   acquire a sender's address from mail data, and store the sender's address as the source identifier in the metadata of the file, and
wherein in (2), (2a), and (2b), the CPU is configured to:
   receive the user exporting operation for attaching the file to a new mail, and send the new mail; and
   acquire an addressee of the new mail as the identifier of the exports destination.

10. The computer system according to claim 9,
wherein in (1) and (1a), the computer is configured:
   by a program module configured to watch TCP connection, to calculate a hash value about the attached file upon receiving the mail data, and to store a combination of the hash value, the sender's address, and a filename of the attached file, to a database which is different area of the metadata of the file; and
   by another program module configured to detect the second part of the user importing operations for saving the attached file, to acquire the sender's address by comparing:
      a filename of the attached filename detected by the another program module, and the filename in the database; and
      a hash value calculated by the another program module, and the hash value in the database.

11. A program distribution server
storing an agent program, which when executed by a computer, executes at least one application program storing and accessing a file in the computer, according to user operations,
wherein the agent program is configured to cause the computer to:
(1) import first information from a first server computer into the file according to a user importing operation, comprising:
   (1a) storing a source identifier designating a source of the first information, in a metadata of the file, wherein the source identifier is acquired by a communication procedure for receiving the first information, according to a communication protocol which is an upper layer protocol relative to TCP (transmission control protocol)/IP (internet protocol) protocol, and
(2) export information in the file to a second server computer, according to a user exporting operation designating the file and exports destination, comprising:
   (2a) acquiring the source identifier from the metadata of the file; and
   (2b) checking a condition to send an alert to the monitoring server using the source identifier and an identifier of the exports destination.

12. The server according to claim 11,
wherein the at least one application program includes a Web browser,
wherein in (1) and (1a), the agent program is configured to cause the computer to:
   receive the user importing operation which is a pointed link or an object in a first Web contents displayed by the Web browser;
   save the first information designated by the pointed link or object into the file; and
   acquire a source URL (universal resource locator) designated by the pointed link or object, and storing the source URL as the source identifier in the metadata of the file, and
wherein in (2), (2a), and (2b), the agent program causes the computer to:

receive the user exporting operation of the designation of a filename of the file on a second Web contents; and acquire a destination URL of another Web contents which is transmitted from the second Web contents after the user exporting operation, as the identifier of the exports destination.

13. The server according to claim 12, wherein the source URL is a URL of a Web contents transmitted from the first Web contents and designated by the pointed link.

14. The server according to claim 11, wherein the at least one application program includes a mail program, wherein in (1) and (1a), the agent program is configured to cause the computer to:

receive a first part of the user importing operation for receiving mail data, and a second part of the user importing operation for saving an attached file of the mail data;

save the attached file into the file;

acquire a sender's address from mail data, and store the sender's address as the source identifier in the metadata of the file, and wherein in (2), (2a), and (2b), the agent program causes the computer to:

receive the user exporting operation for attaching the file to a new mail, and send the new mail; and acquire an addressee of the new mail as the identifier of the exports destination.

15. The server according to claim 14, wherein in (1) and (1a), the agent program is configured to cause the computer:

by a program module configured to watch TCP connection, to calculate a hash value about the attached file upon receiving the mail data, and to store a combination of the hash value, the sender's address, and a filename of the attached file, to a database which is different area of the metadata of the file; and by another program module to detect the second part of the user importing operations for saving the attached file, to acquire the sender's address by comparing:

a filename of the attached filename detected by the another program module, and the filename in the database; and a hash value calculated by the another program module, and the hash value in the database.

* * * * *